(12) United States Patent
Yoshida et al.

(10) Patent No.: US 12,072,658 B2
(45) Date of Patent: Aug. 27, 2024

(54) SHEET LAMINATOR AND IMAGE FORMING SYSTEM INCORPORATING THE SHEET LAMINATOR

(71) Applicants: Shota Yoshida, Kanagawa (JP); Keisuke Sugiyama, Kanagawa (JP); Yuichiro Kato, Kanagawa (JP); Kazuki Shimodate, Kanagawa (JP); Takaya Ochiai, Kanagawa (JP); Naoki Takai, Tokyo (JP); Yosuke Saito, Kanagawa (JP)

(72) Inventors: Shota Yoshida, Kanagawa (JP); Keisuke Sugiyama, Kanagawa (JP); Yuichiro Kato, Kanagawa (JP); Kazuki Shimodate, Kanagawa (JP); Takaya Ochiai, Kanagawa (JP); Naoki Takai, Tokyo (JP); Yosuke Saito, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/210,095

(22) Filed: Jun. 15, 2023

(65) Prior Publication Data

US 2023/0408961 A1    Dec. 21, 2023

(30) Foreign Application Priority Data

Jun. 17, 2022 (JP) .................................. 2022-097911
Apr. 19, 2023 (JP) .................................. 2023-068382

(51) Int. Cl.
*G03G 15/20* (2006.01)
*B32B 37/00* (2006.01)
(Continued)

(52) U.S. Cl.
CPC ..... *G03G 15/6585* (2013.01); *B32B 37/0053* (2013.01); *B32B 37/06* (2013.01); *B32B 41/00* (2013.01); *B32B 2037/0061* (2013.01)

(58) Field of Classification Search
CPC .................. G03G 15/6585; B32B 37/0053; B32B 37/06; B32B 41/00
(Continued)

(56) References Cited

U.S. PATENT DOCUMENTS

2005/0039859 A1   2/2005  Sugaya et al.
2013/0089348 A1*  4/2013  Lin ................... G03G 15/6573
                                                              399/342
(Continued)

FOREIGN PATENT DOCUMENTS

JP      10-202744      8/1998
JP      11-084934      3/1999
(Continued)

OTHER PUBLICATIONS

Extended European Search Report issued Nov. 23, 2023, in corresponding European Patent Application No. 23179665.7, 5 pages.
(Continued)

*Primary Examiner* — Hoan H Tran
(74) *Attorney, Agent, or Firm* — XSENSUS LLP

(57) ABSTRACT

A sheet laminator includes a thermal fixing roller pair, a first heater, a second heater, multiple temperature detectors, and a driver. The thermal fixing roller pair includes a first thermal fixing roller and a second thermal fixing roller facing the first thermal fixing roller. The thermal fixing roller pair thermally fixes and conveys a two-ply sheet and a sheet medium nipped between two sheets of the two-ply sheet. The first heater heats the first thermal fixing roller. The second heater heats the second thermal fixing roller. The multiple temperature detectors are at different positions along an axial direction of the thermal fixing roller pair. The multiple temperature detectors detect a surface temperature of the thermal fixing roller pair. The driver drives the thermal fixing roller pair.

7 Claims, 24 Drawing Sheets

(51) Int. Cl.
*B32B 37/06* (2006.01)
*B32B 41/00* (2006.01)
*G03G 15/00* (2006.01)

(58) Field of Classification Search
USPC .......................................................... 399/342
See application file for complete search history.

(56) References Cited

U.S. PATENT DOCUMENTS

| | | |
|---|---|---|
| 2021/0039904 A1 | 2/2021 | Sugiyama |
| 2022/0169458 A1 | 6/2022 | Suzuki et al. |

FOREIGN PATENT DOCUMENTS

| | | | |
|---|---|---|---|
| JP | 2008-047766 | * | 2/2008 |
| JP | 2013-095117 | | 5/2013 |
| JP | 2022-184407 | * | 12/2022 |

OTHER PUBLICATIONS

U.S. Appl. No. 18/061,232, filed Dec. 2, 2022, Keisuke Sugiyama, et al.
U.S. Appl. No. 17/969,148, filed Oct. 19, 2022, Shinya Monma, et al.
U.S. Appl. No. 18/060,256, filed Nov. 30, 2022, Wataru Takahashi, et al.
U.S. Appl. No. 17/974,987, filed Oct. 27, 2022, Shoh Asano, et al.

* cited by examiner

SHEET LAMINATOR AND IMAGE FORMING SYSTEM INCORPORATING THE SHEET LAMINATOR

CROSS-REFERENCE TO RELATED APPLICATIONS

This patent application is based on and claims priority pursuant to 35 U.S.C. § 119(a) to Japanese Patent Application Nos. 2022-097911, filed on Jun. 17, 2022, and 2023-068382, filed on Apr. 19, 2023, in the Japan Patent Office, the entire disclosure of each of which is hereby incorporated by reference herein.

BACKGROUND

Technical Field

Embodiments of the present disclosure relate to a sheet laminator and an image forming system incorporating the sheet laminator.

Background Art

Lamination technologies are known in the art that insert an inner sheet (e.g., paper or photo) between a two-ply lamination sheet or lamination film (e.g., a lamination pouch or lamination folder) and apply heat and pressure to the two-ply lamination sheet to bond the two-ply lamination sheet. The two-ply lamination sheet is made of two sheets (plies) bonded (sealed) on one side as if one sheet is folded.

The sheet laminator that performs a sheet laminating operation includes a thermal fixing unit that applies heat and pressure to the two-ply sheet. The thermal fixing unit includes a pair of thermal fixing rollers that are heated and rotated to form a nip region through which the two-ply sheet passes. The two-ply sheet that nips a sheet medium passes through the nip region, so that the two-ply sheet can be thermally fixed (adhered).

For example, a sheet laminator in the related art includes a configuration in which a plurality of temperature sensors are arranged in a film conveyance direction for the purpose of accurately controlling the temperature of a lamination film and obtaining preferable adhesiveness of the laminate film.

Further, another sheet laminator in the related art includes a configuration of a fixing device included in an image forming apparatus in which a plurality of temperature sensors are in contact with a fixing roller in an axial direction of the fixing roller for the purpose of making a surface temperature of the fixing roller uniform over an entire region (a sheet passing portion and a non-sheet passing portion).

As described above, in the configuration including a plurality of temperature sensors, even if one sensor becomes unusable due to, for example, a failure, the temperature can be detected by another sensor, and thus the redundancy of the device can be increased.

SUMMARY

Embodiments of the present disclosure described herein provide a novel sheet laminator including a thermal fixing roller pair, a first heater, a second heater, multiple temperature detectors, and a driver. The thermal fixing roller pair includes a first thermal fixing roller and a second thermal fixing roller facing the first thermal fixing roller. The thermal fixing roller pair thermally fixes and conveys a two-ply sheet and a sheet medium nipped between two sheets of the two-ply sheet. The first heater heats the first thermal fixing roller. The second heater heats the second thermal fixing roller. The multiple temperature detectors are at different positions along an axial direction of the thermal fixing roller pair. The multiple temperature detectors detect a surface temperature of each of the thermal fixing roller pair. The driver drives the thermal fixing roller pair.

Further, embodiments of the present disclosure described herein an image forming system including the above-described sheet laminator and an image forming apparatus to form an image on a sheet medium to be supplied to the sheet laminator.

BRIEF DESCRIPTION OF THE SEVERAL VIEWS OF THE DRAWINGS

Exemplary embodiments of this disclosure will be described in detail based on the following figures, wherein:

FIG. 30 including

Figure 1:
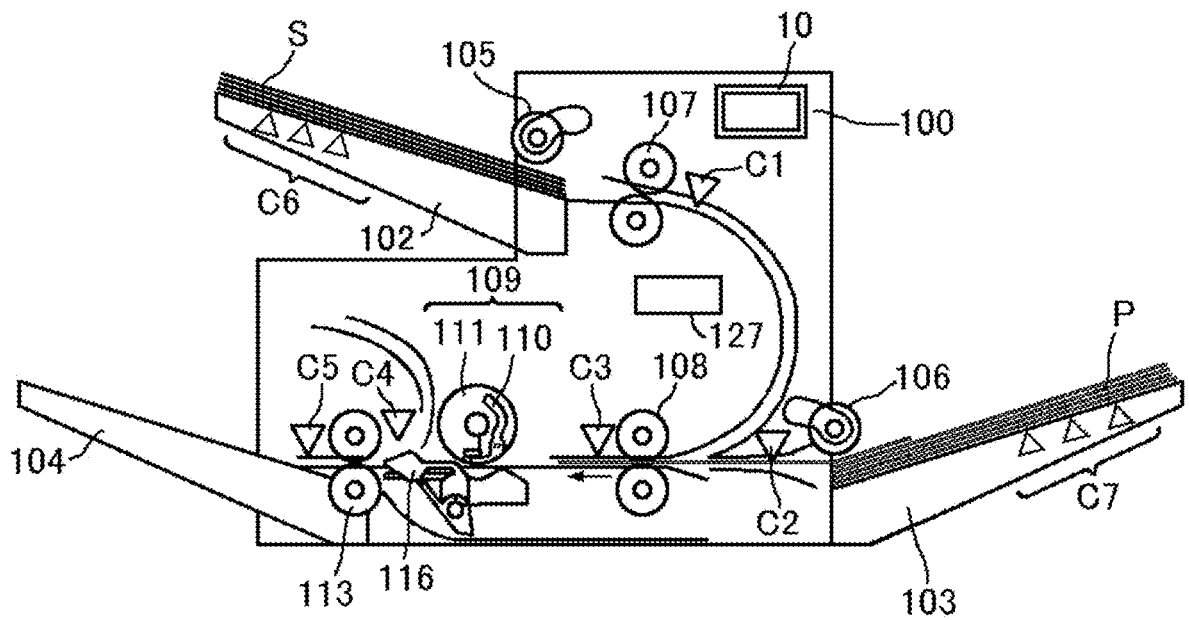
FIG. 1 is a schematic diagram illustrating an overall configuration of a sheet processing device according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

It will be understood that if an element or layer is referred to as being "on," "against," "connected to" or "coupled to" another element or layer, then it can be directly on, against, connected or coupled to the other element or layer, or intervening elements or layers may be present. In contrast, if an element is referred to as being "directly on," "directly connected to" or "directly coupled to" another element or layer, then there are no intervening elements or layers present. As used herein, the term "connected/coupled" includes both direct connections and connections in which there are one or more intermediate connecting elements. Like numbers refer to like elements throughout. As used herein, the term "and/or" includes any and all combinations of one or more of the associated listed items.

Spatially relative terms, such as "beneath," "below," "lower," "above," "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

The terminology used herein is for describing particular embodiments and examples and is not intended to be limiting of exemplary embodiments of this disclosure. As used herein, the singular forms "a," "an," and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Referring now to the drawings, embodiments of the present disclosure are described below. In the drawings for explaining the following embodiments, the same reference codes are allocated to elements (members or components) having the same function or shape and redundant descriptions thereof are omitted below.

FIG. 1 is a diagram illustrating an overall configuration of a sheet processing device according to an embodiment of the present disclosure.

A sheet processing device 100 according to the present embodiment is to separate two sheets (plies) of a two-ply sheet (hereinafter referred to as a lamination sheet S) and to insert and sandwich a sheet-shaped medium (hereinafter referred to as an inner sheet P) between the separated sheets of the two-ply sheet.

The lamination sheet S is a two-ply sheet in which two sheets are overlapped and bonded together at a portion (or a side) of the two-ply sheet. For example, a two-ply sheet has two sheets (two sides). A first side of the two-ply sheet serves as a transparent sheet such as a transparent polyester sheet, a second side of the two-ply sheet serves as a transparent or opaque sheet is disposed facing the first side, and the first and second sides are bonded at one side of the two-ply sheet. Examples of the two-ply sheet also include a lamination film.

The inner sheet P is an example of the sheet medium that is inserted into the two-ply sheet. Examples of the sheet medium include thick paper, postcards, envelopes, plain paper, thin paper, coated paper, art paper, tracing paper, and overhead projector (OHP) transparencies.

As illustrated in FIG. 1, the sheet processing device 100 includes a sheet tray 102, a pickup roller 105, and a conveyance roller pair 107. The sheet tray 102 serving as a first sheet stacker on which the two-ply sheets S are placed. The pickup roller 105 feeds the two-ply sheet S from the sheet tray 102. The sheet processing device 100 further includes a sheet tray 103 as a second sheet stacker on which the inner sheet P is stacked, and a pickup roller 106 that feeds the inner sheet P from the sheet tray 103.

The sheet tray 102 includes a sheet size sensor C6 that serves as a sheet size detector to detect the size of the lamination sheet S, in other words, the length of the lamination sheet S in the sheet conveyance direction. The sheet tray 103 includes a sheet size sensor C7 that serves as a medium size detector to detect the size of the inner sheet P, in other words, the length of the inner sheet P in the sheet conveyance direction.

Each of the sheet size sensor C6 and the sheet size sensor C7 includes a plurality of sensors arranged side by side in the sheet conveyance direction. Since the detection results of the sensors change depending on the size of the stacked lamination sheets S (or the inner sheets P), the sheet size sensors C6 and C7 can detect the length of the lamination sheet S (or the insertion sheet P) in the sheet conveyance direction.

A sheet conveyance sensor C1 is disposed downstream from the conveyance roller pair 107 in the sheet conveyance direction to detect the sheet conveyance position of the two-ply sheet S.

A sheet conveyance sensor C2 is disposed downstream from the pickup roller 106 in the sheet conveyance direction to detect the sheet conveyance position of the inner sheet P.

The sheet conveyance sensors C1 and C2 may be used to detect the length of the lamination sheet S (or the inner sheet P) in the sheet conveyance direction.

The sheet processing device 100 further includes an entrance roller pair 108 as a first conveyor, a winding roller 109 as a rotary member, an exit roller pair 113 as a second conveyor, and a sheet ejection tray 104. The entrance roller pair 108, the winding roller 109, the exit roller pair 113, and the sheet ejection tray 104 are disposed downstream from the conveyance roller pair 107 and the pickup roller 106 in the sheet conveyance direction. The sheet processing device 100 further includes separation members 116 between the winding roller 109 and the exit roller pair 113. Each of the separation members 116 is movable in the width direction of the lamination sheet S.

A sheet conveyance sensor C3 is disposed downstream from the entrance roller pair 108 in the sheet conveyance direction to detect the sheet conveyance position of the lamination sheet S and the sheet conveyance position of the inner sheet PM.

An abnormal condition detection sensor C4 is disposed downstream from the winding roller 109 in the sheet conveyance direction to detect the condition of the lamination sheet S.

A sheet conveyance sensor C5 is disposed downstream from the exit roller pair 113 in the sheet conveyance direction to detect the sheet conveyance position of the lamination sheet S.

Each of the pickup roller 105, the conveyance roller pair 107, the entrance roller pair 108, and the winding roller 109 serves as a first sheet feeder, and each of the pickup roller 106, the entrance roller pair 108, and the winding roller 109 serves as a second sheet feeder.

An operation panel 10 is provided on the exterior of the sheet processing device 100. The operation panel 10 serves as a display-operation device to display information of the sheet processing device 100 and receives input of the operation of the sheet processing device 100. The operation panel 10 also serves as a notification device to output a perceptual signal to a user. As an alternative, a notification device other than the operation panel 10 may be separately provided in the sheet processing device 100.

The sheet processing device 100 according to the present embodiment stacks lamination sheets S and inner sheets P on separate trays. As a lamination sheet S is conveyed into the sheet processing device 100, the sheet processing device 100 separates and opens the lamination sheet S into two sheets and inserts the inner sheet P into an opening of the lamination sheet S.

The exit roller pair 113 ejects and stacks the lamination sheet S, in which the inner sheet P has been inserted, onto the sheet ejection tray 104.

Figure 2:
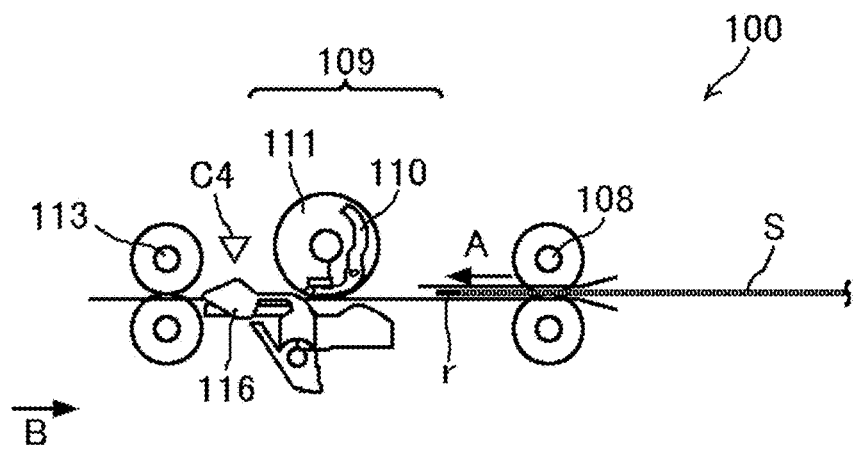
FIG. 2 is a diagram illustrating a main part of the sheet processing device of FIG. 1.

FIG. 2 is a diagram illustrating the main part of the sheet processing device 100 of FIG. 1.

As illustrated in FIG. 2, each of the entrance roller pair 108 and the exit roller pair 113 is, for example, two rollers paired with each other and driven by a driver such as a motor. Specifically, the entrance roller pair 108 is driven and rotated by an entrance roller pair motor 108a serving as a driver (see FIG. 29), and the exit roller pair 113 is driven and rotated by an exit roller pair motor 113a (see FIG. 29). The entrance roller pair 108 rotates in one direction. The exit roller pair 113 rotates in forward and reverse directions, thereby nipping and conveying the lamination sheet S and the inner sheet P.

The entrance roller pair 108 conveys the lamination sheet S and the inner sheet P toward the exit roller pair 113.

The sheet conveyance direction indicated by arrow A in FIG. 2 is hereinafter referred to as a "forward conveyance direction" or a sheet conveyance direction A.

On the other hand, the exit roller pair 113 can switch the direction of rotation between the forward conveyance direction and a direction opposite to the forward conveyance direction. The exit roller pair 113 conveys the lamination sheet S nipped by the rollers of the exit roller pair 113 toward the sheet ejection tray 104 (see FIG. 1) in the forward conveyance direction and also conveys the lamination sheet S toward the winding roller 109 in the direction opposite the forward conveyance direction (to convey the lamination sheet S in reverse). The sheet conveyance direction of the lamination sheet S toward the winding roller 109 (in other words, the direction opposite to the forward conveyance direction) indicated by arrow B in FIG. 2 is hereinafter referred to as a reverse conveyance direction or a sheet conveyance direction B.

The sheet processing device 100 further includes a sheet separation unit 1 between the entrance roller pair 108 and the exit roller pair 113. The sheet separation unit 1 includes the winding roller 109 serving as a rotary member and the separation members 116. The winding roller 109 is driven by a winding roller motor 109a (see FIG. 29) to rotate in the forward and reverse conveyance directions. The direction of rotation of the winding roller 109 is switchable between the forward conveyance direction (clockwise direction) and the reverse conveyance direction (counterclockwise direction).

The winding roller 109 includes a roller 11 and a sheet gripper 110 movably disposed on the roller 111 to grip the sheet S. The sheet gripper 110 is driven by a sheet gripper motor 110a (see FIG. 29) to be rotatable with the roller 111. The sheet gripper 110 is movable and grips the leading end of the lamination sheet S with the roller 111. In the present embodiment, the sheet gripper 110 and the roller 111 are separate units. However, the sheet gripper 110 may be formed on the outer circumference of the roller 111 as a single unit.

A description is given of a series of operations performed in the sheet processing device 100, with reference to FIGS. 1 to 17.

The series of operations performed by the sheet processing device 100 indicates the operations from separating the lamination sheet S to inserting the inner sheet P into the lamination sheet S. In FIGS. 3 to 17, elements identical to those illustrated in FIG. 1 or 2 are given identical reference numerals, and the descriptions thereof are omitted.

FIGS. 3 to 9 are diagrams, each illustrating the main part of the sheet processing device 100 in an operation subsequent to the operation of the previous drawing.

Figure 10:
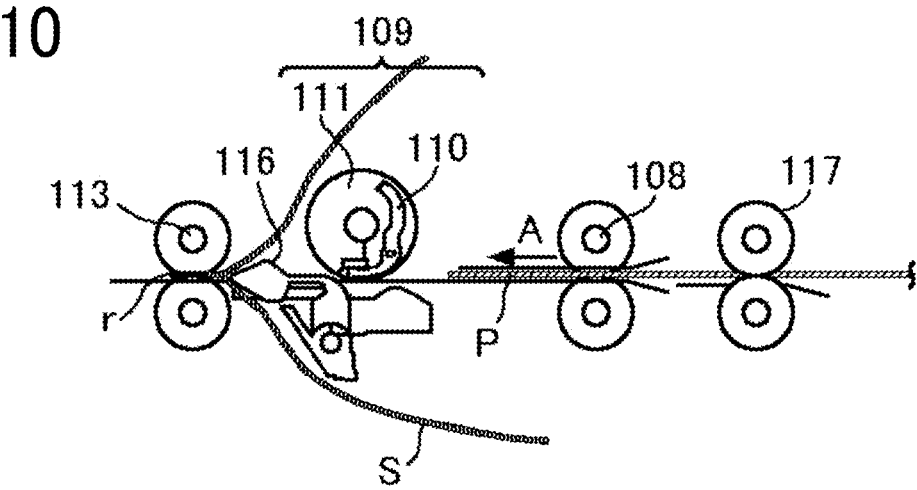
FIG. 10 is a diagram illustrating the sheet processing device performing an operation in a single sheet insertion mode.
Figure 11:
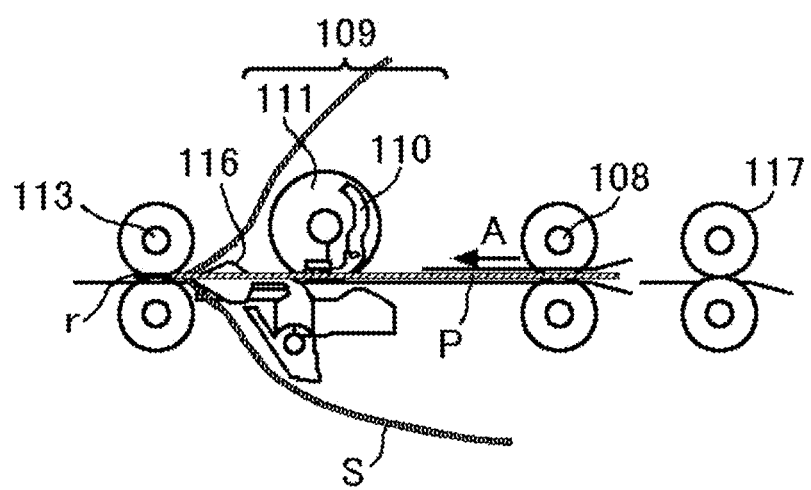
FIG. 11 is a diagram illustrating the sheet processing device performing an operation in the single sheet insertion mode, subsequent to the operation illustrated in FIG. 10.
Figure 12:
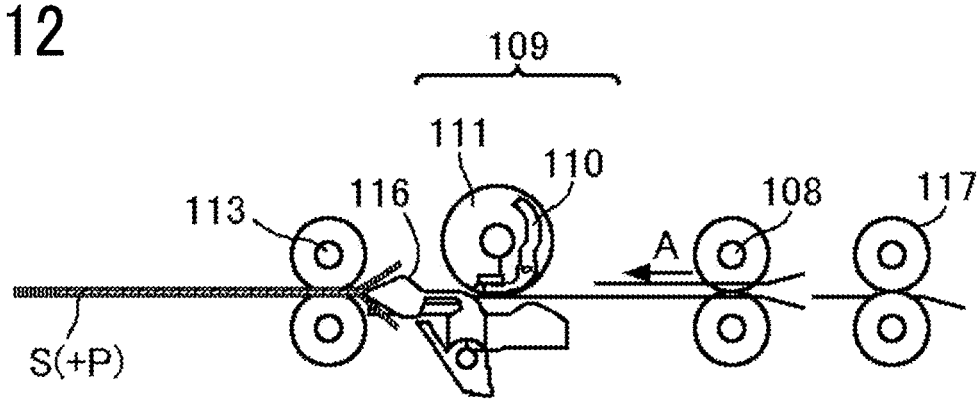
FIG. 12 is a diagram illustrating the sheet processing device performing an operation in the single sheet insertion mode, subsequent to the operation illustrated in FIG. 11.

FIGS. 10, 11, and 12 are diagrams, each illustrating the sheet processing device 100 performing an operation in a single sheet insertion mode.

FIGS. 13, 14, 15, and 16 are diagrams, each illustrating the sheet processing device 100 performing an operation in a multiple sheet insertion mode.

Figure 17:
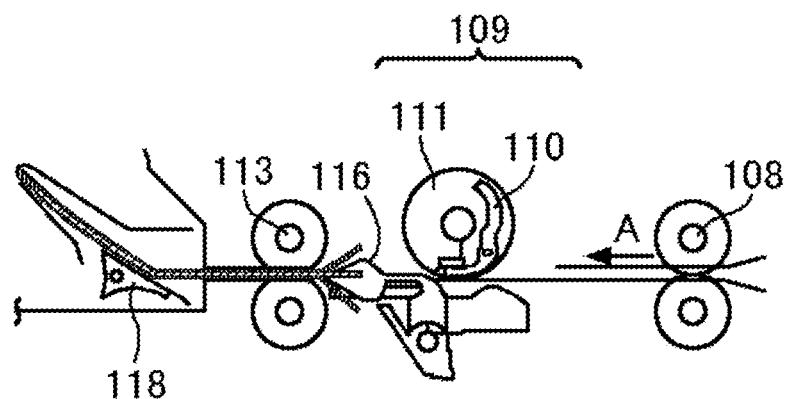
FIG. 17 is a diagram illustrating the main part of the sheet processing device.

FIG. 17 is a diagram illustrating the main part of the sheet processing device 100.

In FIG. 1, the lamination sheet S is loaded on the sheet tray 102 such that a part of the bonded side of the lamination sheet S is located downstream from the pickup roller 105 in the sheet feed direction (sheet conveyance direction). In the sheet processing device 100, the pickup roller 105 picks up the lamination sheet S from the sheet tray 102, and the conveyance roller pair 107 conveys the lamination sheet S toward the entrance roller pair 108.

As illustrated in FIG. 2, the entrance roller pair 108 conveys the two-ply sheet S toward the winding roller 109. In the sheet processing device 100, the entrance roller pair 108 conveys the lamination sheet S with the bonded end, which is one of four sides of the lamination sheet S, as the downstream side in the forward conveyance direction A as indicated by arrow A in FIG. 2.

Figure 3:
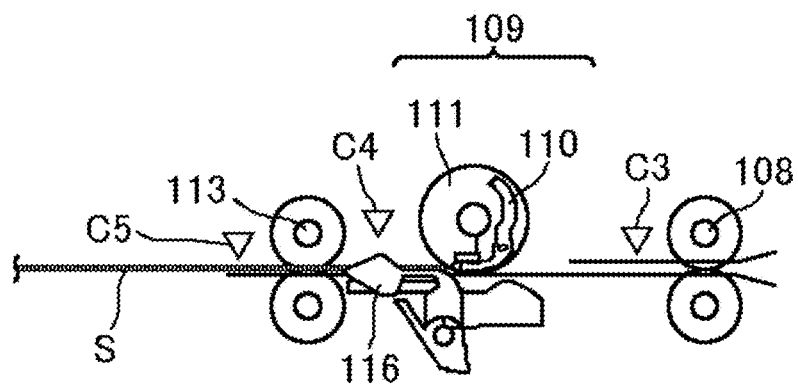
FIG. 3 is a diagram illustrating the main part of the sheet processing device in an operation subsequent to the operation illustrated in FIG. 2.

Subsequently, as illustrated in FIG. 3, the sheet processing device 100 temporarily stops conveyance of the lamination sheet S when the trailing end of the lamination sheet S in the forward conveyance direction has passed the winding roller 109. These operations are performed by conveying the two-ply sheet S from the sheet conveyance sensor C3 by a designated amount in response to the timing at which the sheet conveyance sensor C3 detects the leading end of the two-ply sheet S.

Figure 4:
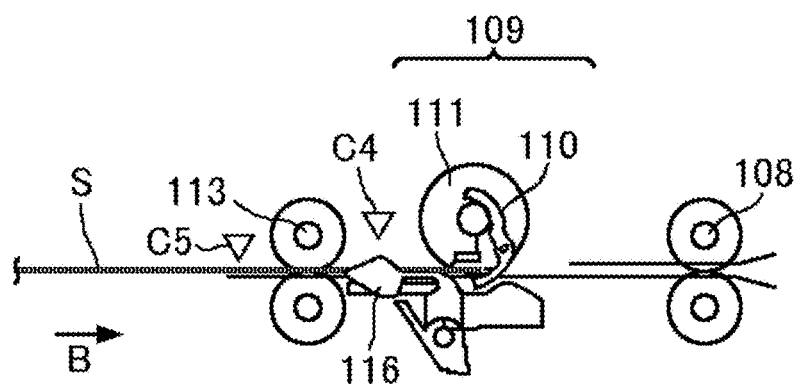
FIG. 4 is a diagram illustrating the main part of the sheet processing device in an operation subsequent to the operation illustrated in FIG. 3.

As illustrated in FIG. 4, the sheet processing device 100 causes the sheet gripper 110 to open and the exit roller pair 113 to rotate in the reverse direction to convey the lamination sheet S in the reverse conveyance direction (i.e., the reverse conveyance direction B) toward an opening portion of the sheet gripper 110.

Figure 5:
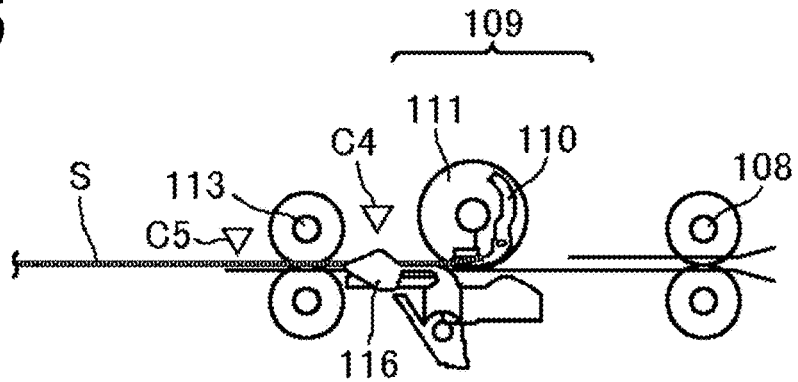
FIG. 5 is a diagram illustrating the main part of the sheet processing device in an operation subsequent to the operation illustrated in FIG. 4.

Subsequently, as illustrated in FIG. 5, the sheet processing device 100 stops conveyance of the lamination sheet S when the trailing end of the lamination sheet S is inserted into the opening portion of the sheet gripper 110, and causes the sheet gripper 110 to close and grip the trailing end of the lamination sheet S. These operations are performed when the lamination sheet S is conveyed by the designated amount.

Figure 6:
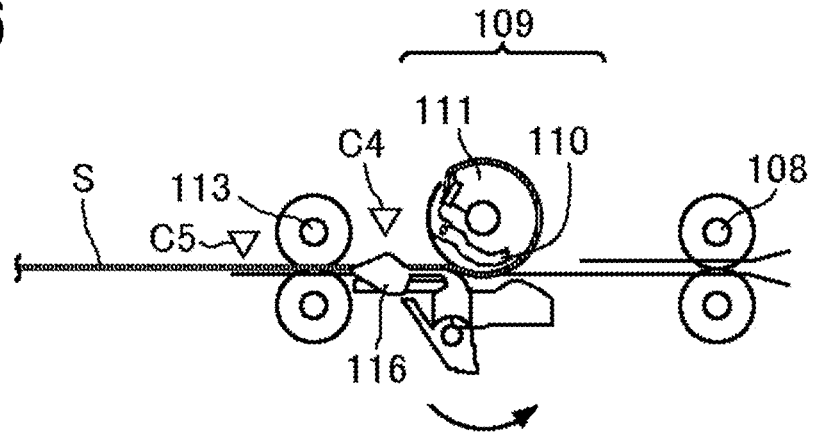
FIG. 6 is a diagram illustrating the main part of the sheet processing device in an operation subsequent to the operation illustrated in FIG. 5.

Then, as illustrated in FIG. 6, the sheet processing device 100 causes the driver to rotate the winding roller 109 in the counterclockwise direction in FIG. 6 to wind the lamination sheet S around the winding roller 109. The lamination sheet S is wound around the winding roller 109 from the side where the two sheets of the lamination sheet S are overlapped but not bonded.

Figure 7:
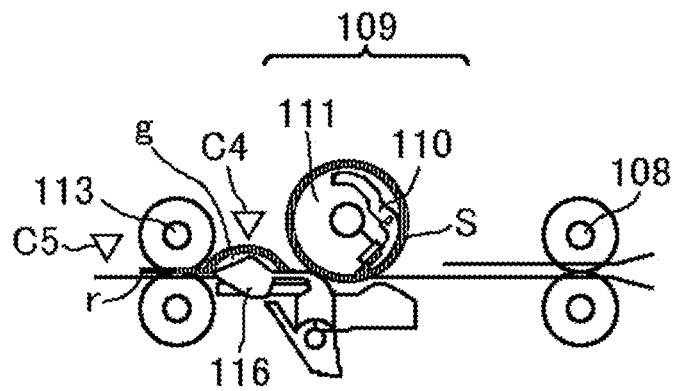
FIG. 7 is a diagram illustrating the main part of the sheet processing device in an operation subsequent to the operation illustrated in FIG. 6.

As illustrated in FIG. 7, when the lamination sheet S is wound around the winding roller 109, a winding circumferential length difference is created between the two sheets in the amount of winding of the lamination sheet S (i.e., two-ply sheet) around the circumference of the winding roller 109. There is a surplus of the sheet on the inner circumferential side to the center of the winding roller 109, which generates a slack toward the bonded end. As a result, a space g (slack) is created between the two sheets of the lamination sheet S.

As the separation members 116 are inserted into the space g formed as described above, from opposed sides of the lamination sheet S, the space g between the two sheets is maintained. In response to the detection of the leading end of the lamination sheet S with the sheet conveyance sensor C5, the lamination sheet S is conveyed from the sheet conveyance sensor C5 by a designated amount to perform these operations.

A description is now given of the separation members 116.

Figure 18:
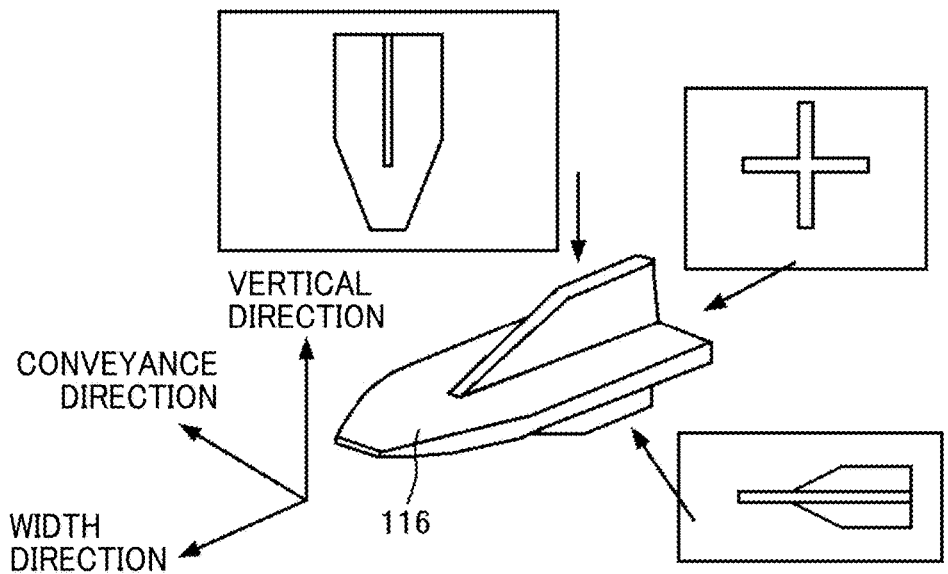
FIG. 18 is a schematic view of a separation member included in the sheet processing device.

FIG. 18 is a schematic view of the separation member 116 included in the sheet processing device 100.

Figure 19A:
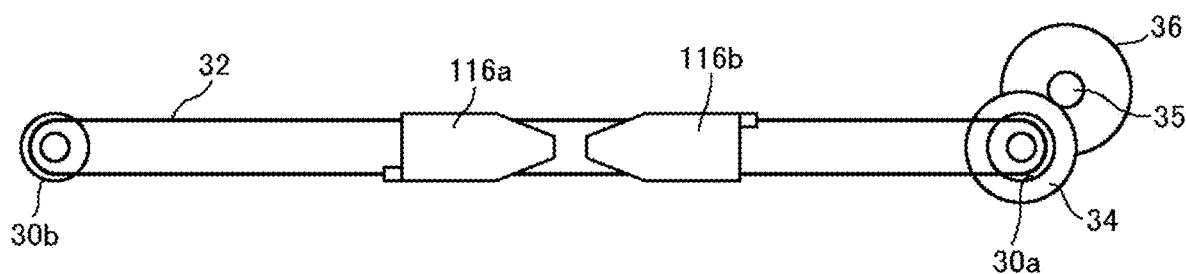
FIGS. 19A and 19B are schematic views, each illustrating an example of a drive configuration of the separation members.
Figure 19B:
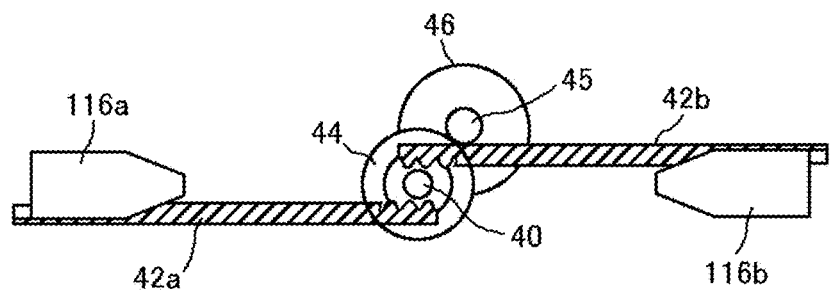

FIGS. 19A and 19B are schematic views, each illustrating an example of a drive configuration of the separation members 116.

Figure 20:
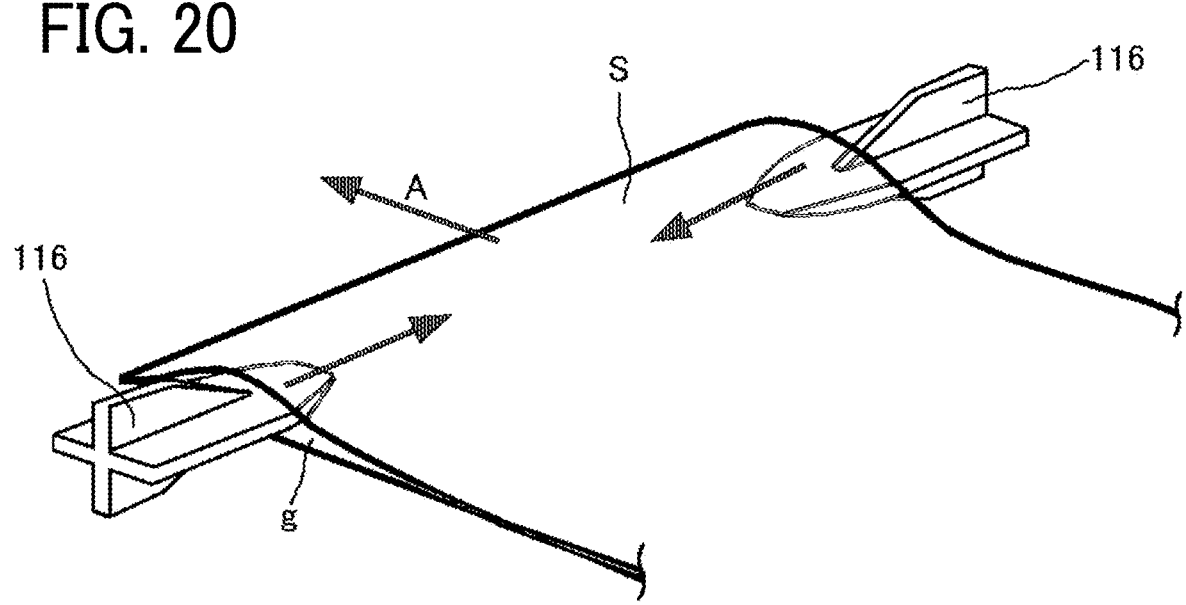
FIG. 20 is a perspective view of a state in which the separation members are inserted into a lamination sheet.

Further, FIG. 20 is a perspective view of a state in which the separation members 116 are inserted into the lamination sheet S.

As illustrated in FIG. 18, when viewed from the upstream side in the sheet conveyance direction, the size in the height (vertical direction) of the separation member 116 gradually increases from the center in the width direction to the trailing end (right end in FIG. 18). Further, when viewed from the vertical direction, the size of the separation member 116 in the sheet conveyance direction gradually increases from the leading end to the center. When viewed from the width direction, the separation member 116 has a cross shape. Each separation members 116 further has a branching member that functions as a guide to guide the two sheets separated from the lamination sheet S in different directions due to the above-described cross shape.

Further, in the present embodiment, referring to FIGS. 35A and 35B, the two separation members 116 are disposed facing each other and moved in the approaching direction and the separating direction, for example, by a belt drive mechanism as illustrated in FIG. 19A and by a rack and pinion mechanism illustrated in FIG. 19B.

More specifically, the belt drive mechanism illustrated in FIG. 19A includes a belt 32 stretched between a drive pulley 30a and a driven pulley 30b and the two separation members 116a and 116b are attached to the belt 32 while facing each other. The separation member 116a is attached and connected to the lower part of the belt 32 and the separation member 116b is attached and connected to the upper part of the belt 32.

The drive pulley 30a is provided with a drive transmission gear 34. The rotational output of the separation member motor 36 is transmitted to the drive transmission gear 34 via a motor output gear 35. In other words, the rotational output of the separation member motor 36 is transmitted to the belt 32.

As a result, as the separation member motor 36 is rotated in the clockwise direction (when viewed from the front of the drawing), the separation members 116a and 116b are moved toward each other. By contrast, as the separation member motor 36 is rotated in the counterclockwise direction (when viewed from the front of the drawing), the separation members 116a and 116b are moved away from each other.

The rack and pinion mechanism illustrated in FIG. 19B includes two racks 42a and 42b extending in opposite directions from each other. Each of the racks 42a and 42b meshes with a single pinion 40. The separation member 116a that is attached to the rack 42a faces the separation member 116b that is attached to the rack 42b. The pinion 40 is provided with a drive transmission gear 44. The rotational output of the separation member motor 46 is transmitted to the drive transmission gear 44 via a motor output gear 45. The rotational output of the separation member motor 46 is transmitted to the racks 42a and 42b, respectively.

As a result, as the separation member motor 46 is rotated in the clockwise direction (when viewed from the front of the drawing), the separation members 116a and 116b are moved toward each other. By contrast, as the separation member motor 46 is rotated in the counterclockwise direction (when viewed from the front of the drawing), the separation members 116a and 116b are moved away from each other.

As described above, in the present embodiment, each of the separation members 116a and 116b has the above-mentioned shape and is movable in the width direction of the lamination sheet S. Accordingly, the separation members 116a and 116b are smoothly inserted into the space g created in the lamination sheet S as illustrated in FIG. 20.

A description of a series of operations of the sheet processing device 100 is continued below.

Figure 8:
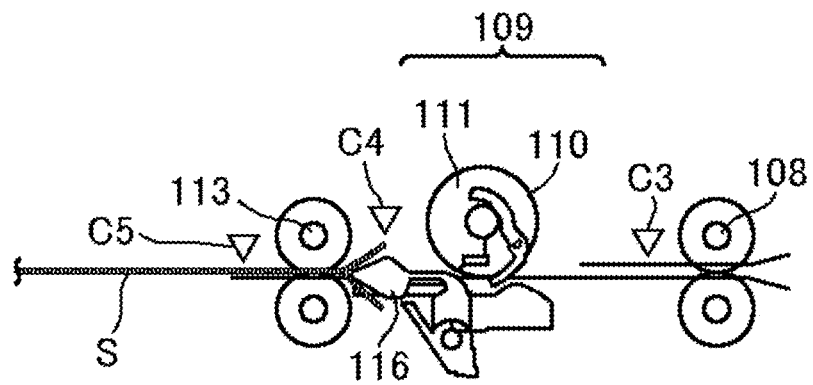
FIG. 8 is a diagram illustrating the main part of the sheet processing device in an operation subsequent to the operation illustrated in FIG. 7.

With the separation members 116 inserted in the space g created in the lamination sheet S (see FIG. 7), the sheet processing device 100 causes the winding roller 109 to rotate in the clockwise direction and shift the space g separating the two sheets of the lamination sheet S to the trailing end of the lamination sheet S in the forward conveyance direction (i.e., the direction indicated by arrow A in FIG. 2), as illustrated in FIG. 8. After the winding roller 109 has been rotated by a designated amount, the sheet processing device 100 causes the sheet gripper 110 to open. As a result, the lamination sheet S is separated into the upper and lower sheets at the trailing end.

In this state, the sheet processing device 100 temporarily stops the conveyance of the lamination sheet S and further moves the separation members 116 in the width direction of the lamination sheet S to separate the whole area of the trailing end of the lamination sheet S. In response to the detection of the leading end of the lamination sheet S with the sheet conveyance sensor C5, the lamination sheet S is conveyed from the sheet conveyance sensor C5 by a designated amount to perform these operations.

Figure 21:
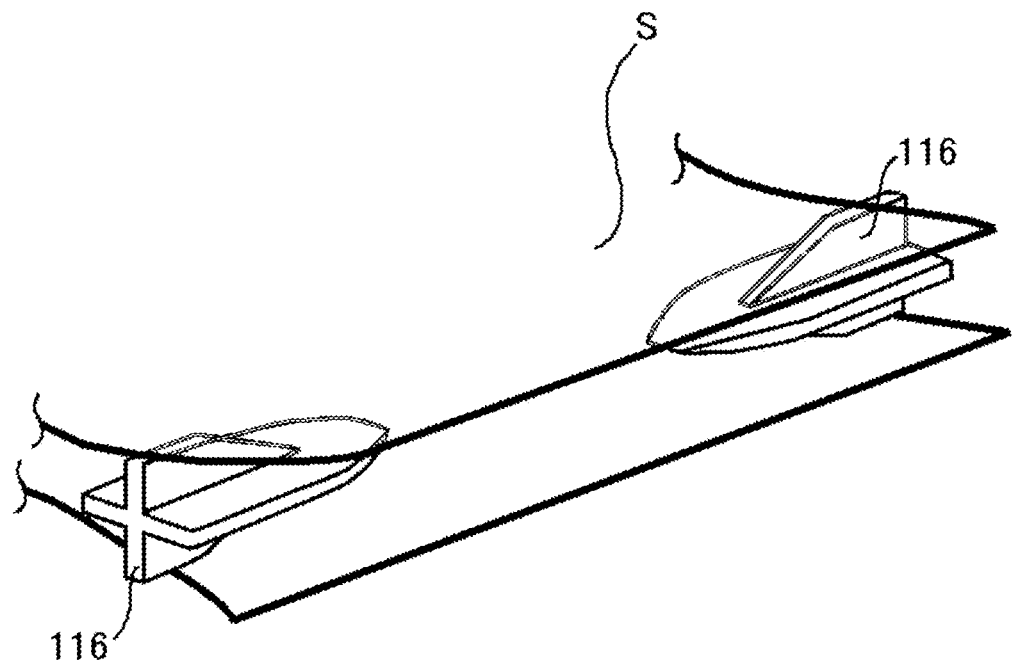
FIG. 21 is a perspective view of the separation members and the lamination sheet in the state illustrated in FIG. 8.

FIG. 21 is a perspective view of the separation members 116 and the lamination sheet S in the state illustrated in FIG. 8.

Figure 22:
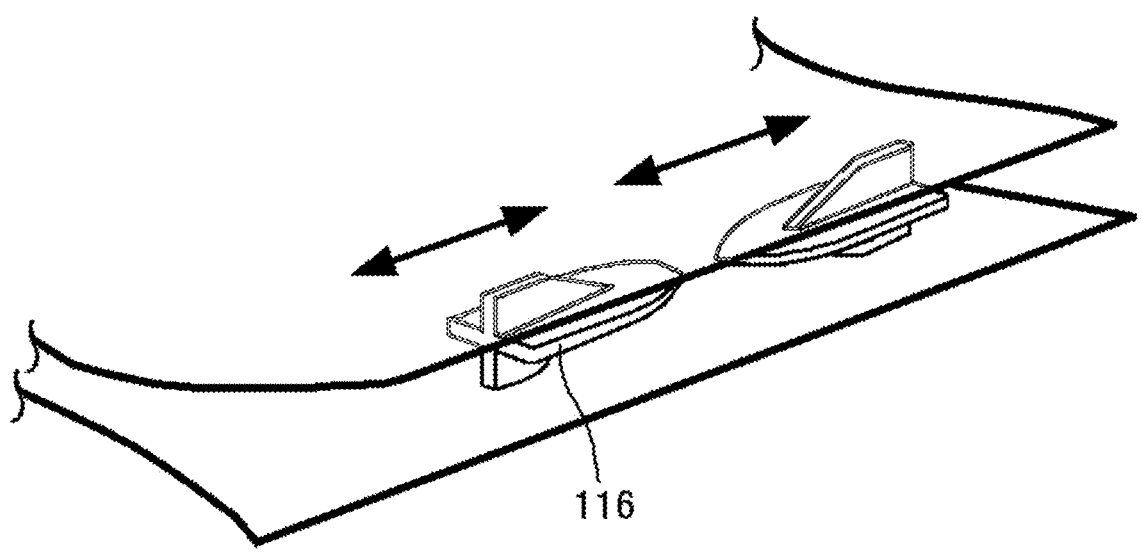
FIG. 22 is another perspective view of the separation member and the lamination sheet in the state illustrated in FIG. 8, performing an operation subsequent to the operation in FIG. 21.

FIG. 22 is another perspective view of the separation member and the lamination sheet in the state illustrated in FIG. 8, performing an operation subsequent to the operation in FIG. 21.

Since each of the separation members 116 further has a branching guide that functions as a guide to guide the two sheets separated from the lamination sheet S in different directions due to the above-described shape (see the cross shape illustrated in FIG. 18), the two sheets separated from the lamination sheet S may be kept in postures to be conveyed to different sheet conveyance passages.

Further, since the separation members 116 are movable in the width direction of the lamination sheet S (see FIGS. 19A and 19B), the separation members 116 are positioned suitably to support the postures of the two sheets of the lamination sheet S as illustrated in FIG. 22. Due to such a configuration, even when the size of the lamination sheet S and the rigidity (or retentivity corresponding to the propensity to retain a particular shape once applied, such as curvature of paper) of the lamination sheet S change, the two sheets separated from the lamination sheet S are guided in desired branching directions. This configuration eliminates the need for a branching member to branch the lamination sheet S over the whole area in the width direction of the sheet conveyance passage and a driver to drive the branching member, thereby reducing the cost when compared with the configuration of a typical sheet processing device.

Figure 9:
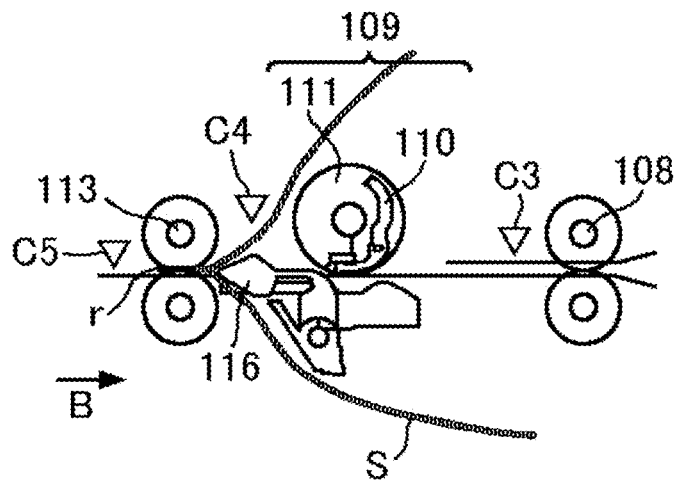
FIG. 9 is a diagram illustrating the main part of the sheet processing device in an operation subsequent to the operation illustrated in FIG. 8.

Subsequently, as illustrated in FIG. 9, after the separation members 116 have separated the whole area of the trailing end of the two-ply sheet S, the sheet processing device 100 causes the driver to rotate the exit roller pair 113 in the counterclockwise direction in FIG. 9 to convey the lamination sheet S in the reverse conveyance direction (i.e., the direction indicated by arrow B in FIG. 9). In other words, the separation members 116 guide the two sheets separated from the lamination sheet S in the upper and lower directions (vertically), respectively, and thus the two sheets are fully separated.

The sheet processing device 100 temporarily stops the conveyance of the lamination sheet S, so that a bonded portion r of the lamination sheet S is gripped (nipped) by the exit roller pair 113. Accordingly, one end of the lamination sheet S is bonded as the bonded side of the lamination sheet S and the other end of the lamination sheet S is opened largely.

In response to the detection of the leading end of the lamination sheet S with the sheet conveyance sensor C5, the lamination sheet S is conveyed from the sheet conveyance sensor C5 by a designated amount to perform these operations.

A description is now given of the operation of inserting an inner sheet into the separated lamination sheet S.

The sheet processing device 100 according to the present embodiment can insert one to a plurality of inner sheets P into a lamination sheet S depending on the size of the lamination sheet S (i.e., the length of the lamination sheet S in the sheet conveyance direction) and the size of the inner sheet P (i.e., the length of the inner sheet P in the sheet conveyance direction).

Firstly, a description is given of a single sheet insertion mode to insert a single inner sheet P into a lamination sheet S, with reference to FIGS. 10 to 12. Then, a description is given of a multiple sheet insertion mode to insert multiple inner sheets P into a lamination sheet S along the sheet conveyance direction, with reference to FIGS. 13 to 16.

Single Sheet Insertion Mode

As illustrated in FIG. 10, the sheet processing device 100 causes the entrance roller pair 108 to rotate to convey the inner sheet P conveyed from the sheet tray 103 (see FIG. 1) via a sheet conveyance roller pair 117 toward the exit roller pair 113 in the forward conveyance direction (i.e., the direction indicated by arrow A in FIG. 10).

Subsequently, as illustrated in FIG. 11, the sheet processing device 100 causes the exit roller pair 113 to rotate so that the lamination sheet S and the inner sheet P meet to insert the inner sheet P into the lamination sheet S from the open portion (on the other end) of the lamination sheet S.

Then, as illustrated in FIG. 12, the exit roller pair 113 of the sheet processing device 100 conveys the lamination sheet S in which the inner sheet P is inserted, in the forward conveyance direction (i.e., the direction indicated by arrow A in FIG. 12). Thus, the two sheets of the lamination sheet S are overlapped one on another again so as to close the open portion of the lamination sheet S. Then, the lamination sheets S with the inner sheet P being inserted are ejected by the exit roller pair 113 or the ejection roller pair 121 (see FIG. 24) disposed downstream from the exit roller pair 113 and are stacked on the sheet ejection tray 104 (see FIG. 1).

Multiple Sheet Insertion Mode

Then, a description is given of the multiple sheet insertion mode.

In the multiple sheet insertion mode, a plurality of inner sheets P (two sheets in the embodiment) are insertable a single lamination sheet S in the sheet conveyance direction.

Figure 13:
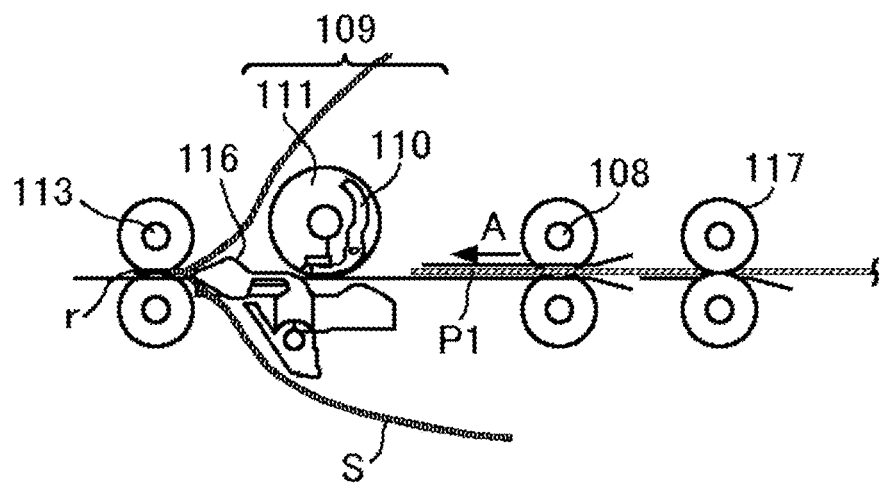
FIG. 13 is a diagram illustrating the sheet processing device performing an operation in a multiple sheet insertion mode.

Then, as illustrated in FIG. 13, the sheet processing device 100 causes the entrance roller pair 108 to rotate to convey a first inner sheet P (hereinafter, referred to as a first inner sheet P1) conveyed from the sheet tray 103 (see FIG. 1) toward the exit roller pair 113 in the forward conveyance direction (i.e., the direction indicated by arrow A in FIG. 2).

Figure 14:
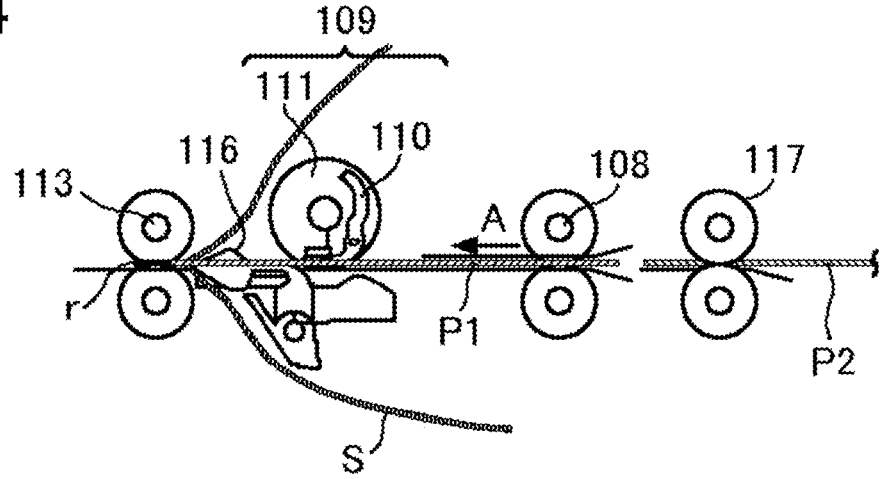
FIG. 14 is a diagram illustrating the sheet processing device performing an operation in the multiple sheet insertion mode, subsequent to the operation illustrated in FIG. 13.

Subsequently, as illustrated in FIG. 14, the sheet processing device 100 causes the exit roller pair 113 to rotate so that the lamination sheet S and the first inner sheet P1 meet. By so doing, the first inner sheet P1 is inserted into the opening of the lamination sheet S.

At this time, the sheet processing device 100 conveys a second inner sheet P (hereinafter, referred to as a second inner sheet P2) conveyed from the sheet tray 103 (see FIG. 1) toward the exit roller pair 113 in the forward conveyance direction (i.e., the direction indicated by arrow A in FIG. 2).

Figure 15:
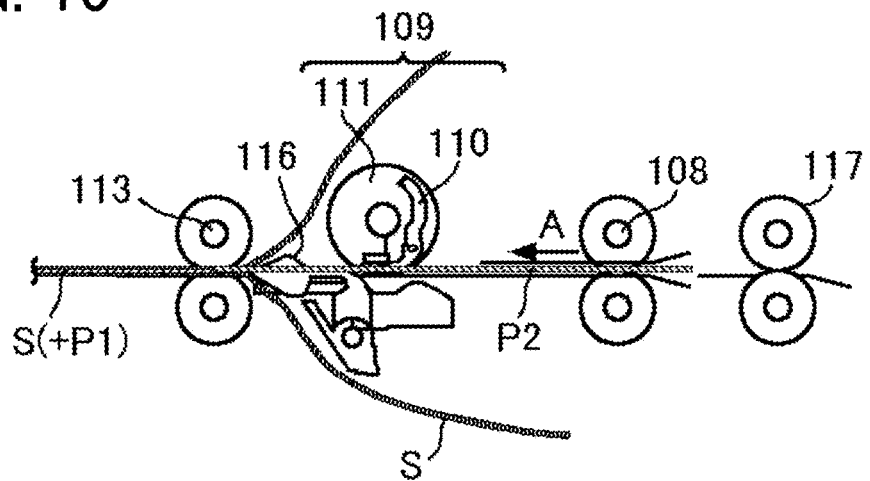
FIG. 15 is a diagram illustrating the sheet processing device performing an operation in the multiple sheet insertion mode, subsequent to the operation illustrated in FIG. 14.

Subsequently, as illustrated in FIG. 15, the sheet processing device 100 causes the entrance roller pair 108 to rotate so that the lamination sheet S and the second insertion sheet P2 meet. By so doing, the second inner sheet P2 is inserted into the opening of the lamination sheet S.

Figure 16:
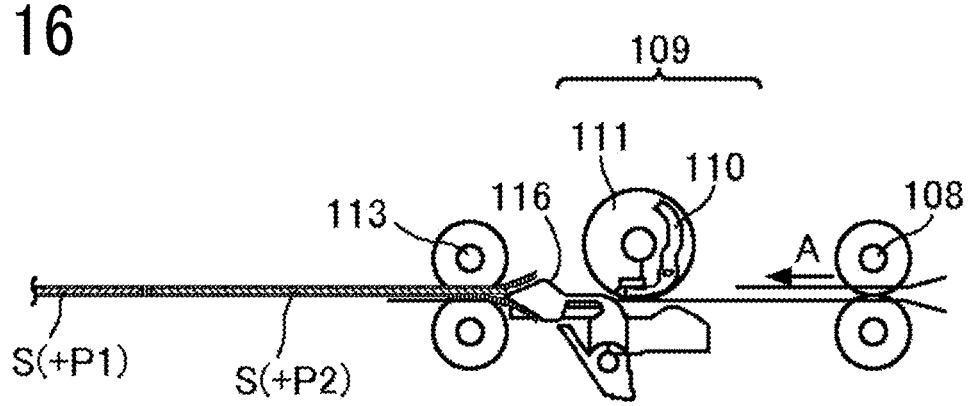
FIG. 16 is a diagram illustrating the sheet processing device performing an operation in the multiple sheet insertion mode, subsequent to the operation illustrated in FIG. 15.

As illustrated in FIG. 16, the sheet processing device 100 causes the exit roller pair 113 to convey the lamination sheet S, with the first inner sheet P1 and the second inner sheet P2 being inserted, in the forward conveyance direction (i.e., the direction indicated by arrow A in FIG. 2). By so doing, the two sheets are overlaid one on another again to close the opening.

Even if there are three or more inner sheets P, the three or more inner sheets P can be inserted in the lamination sheet S by repeating the above-described operations.

As an alternative example, in a case where a sheet processing device includes a thermal-pressure device (see a thermal fixing roller pair 120 in FIG. 24) that can heat and press the lamination sheet S, a branching member 118 may change (switch) the sheet conveyance passage of the lamination sheet S to convey the lamination sheet S to the thermal-pressure device, as illustrated in FIG. 17. Not only in the multiple sheet insertion mode but also in the single sheet insertion mode, the sheet conveyance passage may be changed (switched) with the branching member 118.

As described above, the sheet processing device 100 according to the present embodiment can control the driver and other parts to perform the sheet inserting operation of an inner sheet P or inner sheets P to be inserted into a lamination sheet S.

A description is now given of a configuration in which the sheet processing device 100 acquires the size of the lamination sheet S (i.e., the length in the sheet conveyance direction of the lamination sheet S), the size of the inner sheet P (i.e., the length in the sheet conveyance direction of the inner sheet P), and the number of the inner sheets P to be inserted into the lamination sheet S.

As illustrated in FIG. 1, the sheet processing device 100 according to the present embodiment includes the sheet size sensor C6 serving as a sheet size detector and the sheet size sensor C7 serving as a medium size detector.

Based on the detection results of the sheet size sensors C6 and C7, the sheet processing device 100 determines whether the length of the inner sheet P in the sheet conveyance direction is equal to or smaller than the threshold value. When the length of the inner sheet P in the sheet conveyance direction is equal to or smaller than the threshold value, the sheet processing device 100 automatically switches to the multiple sheet insertion mode to perform the sheet inserting operation. On the other hand, when the length of the inner sheet P in the sheet conveyance direction is greater than the threshold value, the sheet processing device 100 automatically switches to the single sheet insertion mode to perform the sheet inserting operation.

In particular, when the length of the inner sheet P in the sheet conveyance direction is equal to or smaller than half the length of the lamination sheet S in the sheet conveyance direction, the sheet processing device 100 may automatically switch to the multiple sheet insertion mode to perform the sheet inserting operation. In the multiple sheet insertion mode, the sheet processing device 100 determines the number of inner sheets P to be inserted into the lamination sheet S from the quotient of the size of the lamination sheet S divided by the size of inner sheet P.

Instead of or in addition to the detection results of the sheet size sensors C6 and C7, the sheet processing device 100 may use the detection results of the sheet conveyance sensors C1 and C2.

As described above, the sheet processing device 100 according to the present embodiment can automatically control the sheet inserting operation according to the size of the lamination sheet S and the size of the inner sheet P.

Additionally, as illustrated in FIG. 1, the sheet processing device 100 according to the present embodiment can separately stack the lamination sheets S and the inner sheets P on separate trays to be conveyed separately. Accordingly, there is no need to stack the lamination sheets S and the inner sheets P in a predetermined order, and this configuration can enhance the convenience. In the present embodiment, the lamination sheets S are stacked on the sheet tray 102 and the inner sheets P are stacked on the sheet tray 103. However, the tray on which the lamination sheets S are stacked and the tray on which the inner sheets P are stacked are not limited to the above-described trays. For example, the inner sheets P may be stacked on the sheet tray 102 and the lamination sheets S may be loaded on the sheet tray 103.

Modification

Figure 23B:
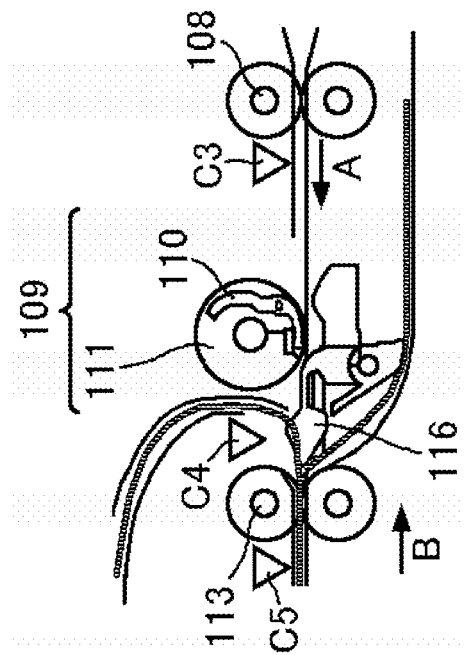
FIGS. 23A, 23B, and 23C are schematic views, each illustrating a sheet guide passage of the two sheets separated from the lamination sheet, according to a modification of the present disclosure.
Figure 23A:
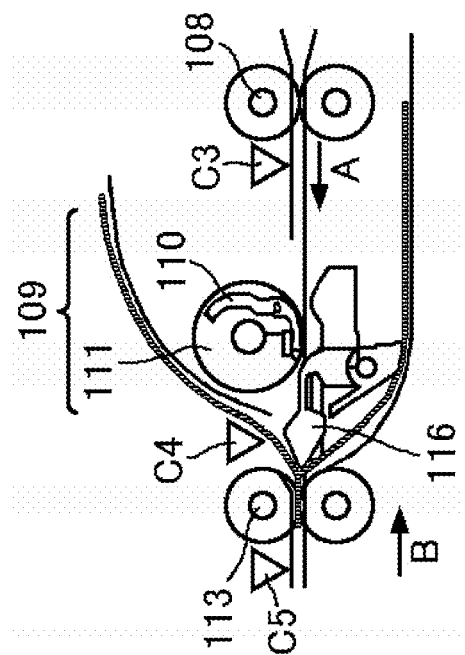
Figure 23C:
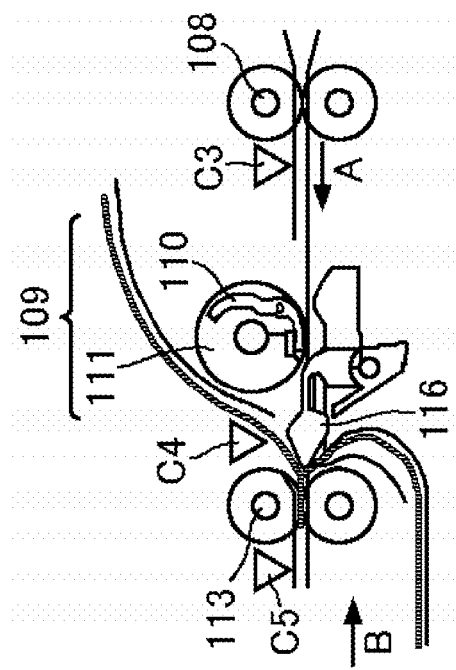

A description is now given of the sheet processing device having another example of a sheet guide passage of the two sheets separated from the lamination sheet S, with reference to FIGS. 23A, 23B, and 23C.

FIGS. 23A, 23B, and 23C are schematic views, each illustrating a sheet guide passage of the two sheets separated from the lamination sheet S, according to a modification of the present disclosure.

Specifically, FIG. 23A illustrates a case where the two separated sheets are guided from the bonded portion r of the lamination sheet S in the direction opposite to the sheet conveyance direction (i.e., the direction indicated by arrow B in FIG. 23A) as illustrated in FIG. 9.

Alternatively, as illustrated in FIG. 23B, the upper sheet of the separated lamination sheet S may be guided from the bonded portion r in the sheet conveyance direction (i.e., the direction indicated by arrow A in FIG. 23B) and the lower sheet of the separated lamination sheet S may be guided from the bonded portion r in the direction opposite to the sheet conveyance direction.

Further, as illustrated in FIG. 23C, the upper sheet of the separated lamination sheet S may be guided from the bonding portion r in the direction opposite to the sheet conveyance direction and the lower sheet of the separated lamination sheet S may be guided from the bonded portion r in the sheet conveyance direction. As illustrated in FIG. 9A, the two sheets separated from each other from the lamination sheet S are branched by the separation members 116 and then guided in the direction opposite to the sheet conveyance direction. However, the two sheets separated from each other from the lamination sheet S may be branched by the separation members 116 and then guided in the sheet conveyance direction.

A description is then given of a sheet laminator including the sheet processing device, an image forming apparatus including the sheet laminator, and an image forming system including the sheet laminator, according to an embodiment of the present disclosure.

Figure 24:
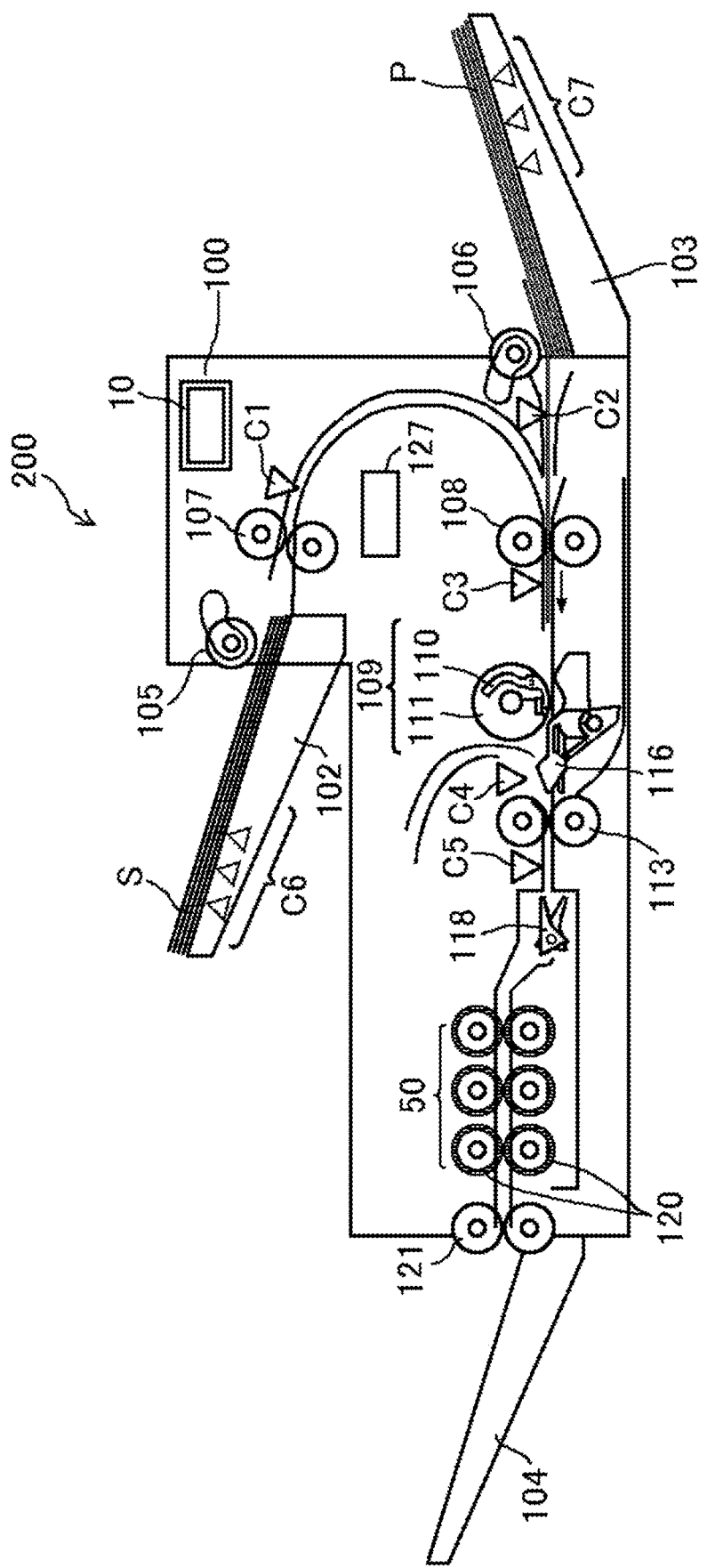
FIG. 24 is a diagram illustrating an overall configuration of a sheet laminator according to an embodiment of the present disclosure, including the sheet processing device.

FIG. 24 is a diagram illustrating an overall configuration of a sheet laminator according to an embodiment of the present disclosure, including the sheet processing device.

As illustrated in FIG. 13, a sheet laminator 200 includes the sheet processing device 100 described above, a branching member 118, a thermal fixing roller pair 120, and an ejection roller pair 121. The branching member 118 changes (switches) the sheet conveyance passage of the lamination sheet S. The thermal fixing roller pair 120 that function as a pair of thermal fixing rollers that can heat and press the lamination sheet S. The ejection roller pair 121 is disposed downstream from the thermal fixing roller pair 120 in the sheet conveyance direction.

The sheet laminator 200 performs a series of operations, in this order, of feeding the lamination sheet S, separating the lamination sheet S, inserting the inner sheet P into the lamination sheet S, and laminating the lamination sheet S with the inner sheet P being inserted, by application of heat and pressure, on a stand-alone basis. This series of operations is carried out automatically without any aid of a user. For this reason, the sheet laminator 200 can enhance and provide the convenience better than a known sheet laminator employing a known technique.

Figure 25:
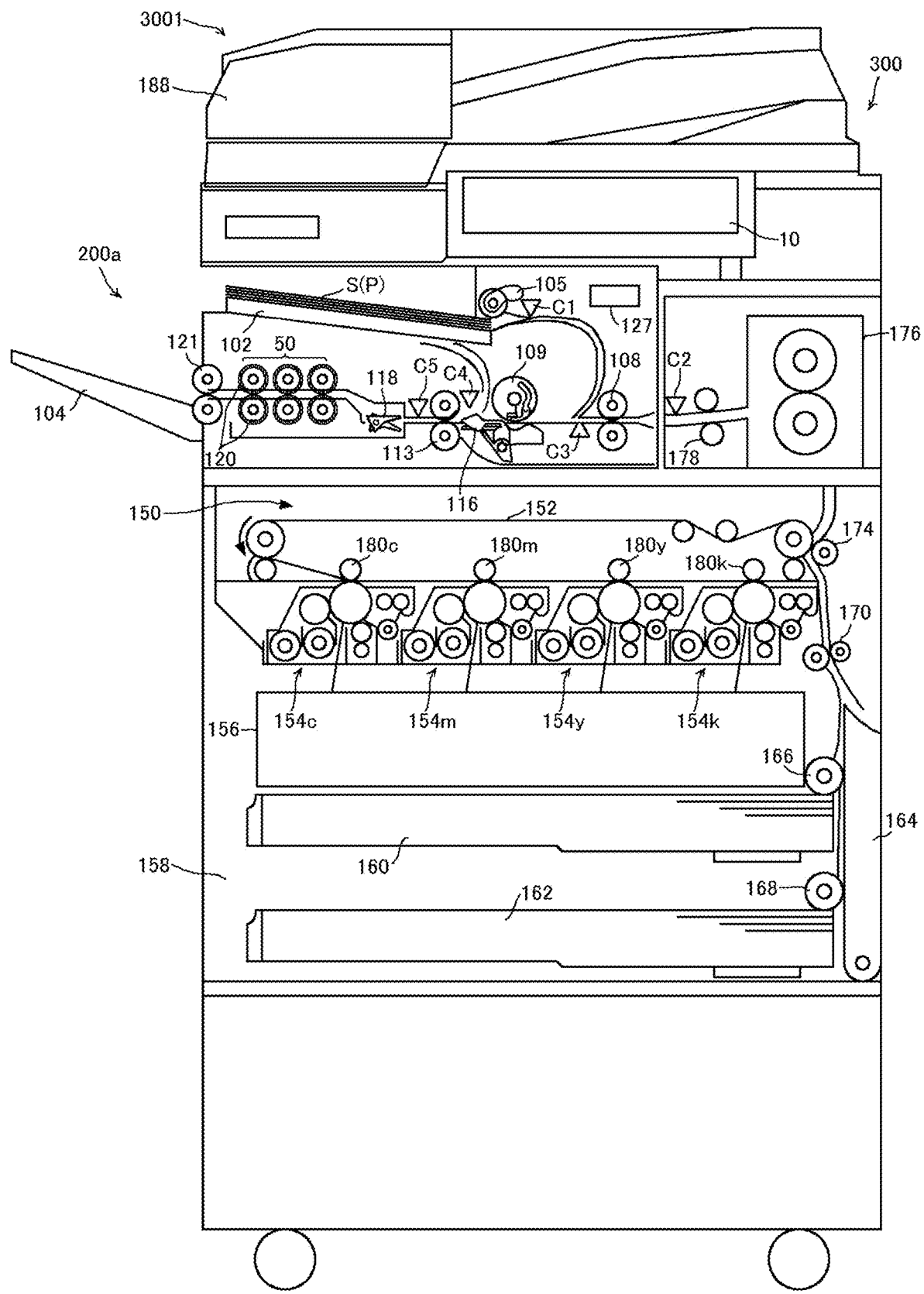
FIG. 25 is a diagram illustrating an overall configuration of an image forming system according to an embodiment of the present disclosure, including the sheet laminator and an image forming apparatus.

FIG. 25 is a diagram illustrating an overall configuration of an image forming system according to an embodiment of the present disclosure, including the sheet laminator and an image forming apparatus.

An image forming system 3001 includes a sheet laminator 200a in an in-body sheet discharging section of an image forming apparatus 300. The sheet laminator 200a functions as a device that performs sheet lamination.

The sheet laminator 200a includes the sheet tray 102 on which the lamination sheets S or the inner sheets P are stacked. The sheet laminator 200a can receive the lamination sheets S, the inner sheets PM, or both from the image forming apparatus 300. Accordingly, the image forming apparatus 300 (e.g., a printer and a copier) can form an image on the lamination sheet S or the inner sheet P by the in-line connection.

A detailed description is given of the configuration of the image forming apparatus 300.

As illustrated in FIG. 25, the image forming apparatus 300 includes an intermediate transfer device 150. The intermediate transfer device 150 includes an intermediate transfer belt 152 having an endless loop and being entrained around a plurality of rollers and stretched substantially horizontally. The intermediate transfer belt 152 rotates in the counterclockwise direction in FIG. 25.

The image forming apparatus 300 further includes image forming units 154c, 154m, 154y, and 154k for cyan (C), magenta (M), yellow (Y), and black (K), respectively. The image forming units 154c, 154m, 154y, and 154k are disposed below the intermediate transfer device 150 in the housing 300a. The image forming units 154c, 154m, 154y, and 154k are aligned in a quadruple tandem manner along an extended direction of the intermediate transfer belt 152. Each of the image forming units 154c, 154m, 154y, and 154k includes a drum-shaped image bearer that rotates in the clockwise direction in FIG. 25. Various image forming components, for example, a charging unit, a developing unit, a transfer unit, and a cleaning unit, are disposed around each of the image forming units 154c, 154m, 154y, and 154k. An exposure device 156 is disposed below the image forming units 154c, 154m, 154y, and 154k included in the image forming apparatus 300.

A sheet feeder 158 is disposed below the exposure device 156 in the image forming apparatus 300. The sheet feeder 158 includes a first sheet tray 160 that stores lamination sheets S and a second sheet tray 162 that stores inner sheets P. The first sheet tray 160 serves as a third sheet stacker on which a two-ply sheet such as the lamination sheet S is stacked. Similarly, the second sheet tray 162 serves as a fourth sheet stacker on which a sheet medium (e.g., the inner sheet P) is stacked.

A first feed roller 166 is disposed at a position upper right of the first sheet tray 160. The first feed roller 166 feeds out the lamination sheet S one by one from the first sheet tray 160 to a sheet conveyance passage 164. A second feed roller 168 is disposed at the upper right of the second sheet tray 162 and feeds the inner sheet P from the second sheet tray 162 one by one to the sheet conveyance passage 164.

The sheet conveyance passage 164 extends upwardly from the lower side to the upper side on the right side in the image forming apparatus 3M) and communicates with the sheet laminator 200a in the image forming apparatus 300. The sheet conveyance passage 164 is provided with, e.g., a conveyance roller pair 170, a secondary transfer device 174 in contact with the intermediate transfer belt 152, a fixing device 176, and a sheet ejection device 178 including the ejection roller pair, serially.

The first feed roller 166, the conveyance roller pair 170, and the sheet conveyance passage 164 serve as a third sheet feeder to feed the two-ply sheet (i.e., the lamination sheet S) from the first sheet tray 160 (serving as a third sheet stacker). The second feed roller 168, the conveyance roller pair 170, and the sheet conveyance passage 164 serve as a fourth sheet feeder to feed the sheet medium (i.e., the inner sheet P) from the second sheet tray 162 (serving as a fourth sheet stacker). Further, the intermediate transfer device 150 and the fixing device 176 serve as a part of the image forming device that forms an image on a sheet medium (i.e., the inner sheet P).

A description is now given of operations of the image forming apparatus 300 according to the present embodiment, to form an image on a sheet medium (i.e., the inner sheet P) and then perform a sheet laminating operation on the lamination sheet S.

To perform an image on the sheet medium (i.e., the inner sheet P), first, an image reading device 188 reads the image on an original document, and the exposure device 156 then performs writing of the image on the original document. The image forming units 154c, 154m, 154y, and 154k form respective toner images of cyan (C), magenta (M), yellow (Y), and black (K), respectively, on the respective image bearers. Then, primary transfer devices 180c, 180m, 180y, and 180k sequentially transfer the respective toner images onto the intermediate transfer belt 152, thereby forming a color image on the intermediate transfer belt 152.

By contrast, the image forming apparatus 300 rotates the second feed roller 168 to feed and convey the inner sheet P to the sheet conveyance passage 164. The inner sheet P is conveyed by the conveyance roller pair 170 through the sheet conveyance passage 164 and is sent to the secondary transfer device 174 in synchrony with movement of the color image on the intermediate transfer belt 152. Then, the secondary transfer device 174 transfers the color image formed on the intermediate transfer belt 152 as described above, onto the inner sheet P.

After the color image has been transferred onto the inner sheet P, the fixing device 176 fixes the color image to the inner sheet P. and the sheet ejection device 178 ejects to convey the inner sheet P to the sheet laminator 200a.

The sheet laminator 200a rotates the pickup roller 105 to pick up the lamination sheet S from the sheet tray 102 and conveys the lamination sheet S to the sheet separation unit 1 (including the winding roller 109 and the separation members 116). The sheet separation unit 1 separates a lamination sheet S into two sheets and conveys an inner sheet P conveyed from the image forming apparatus 300 by the entrance roller pair 108. By so doing, the inner sheet P is inserted between the separated two sheets of the lamination sheet S. Then, the lamination sheet S with the inner sheet P being inserted is conveyed by the exit roller pair 113 to a thermal fixing unit 50. Then, the thermal fixing roller pair 120 of the thermal fixing unit 50 applies heat and pressure to the lamination sheet S in which the inner sheet P is inserted, in other words, the thermal fixing roller pair 120 of the thermal fixing unit 50 performs a sheet laminating operation on the lamination sheet S with the inner sheet P being inserted.

As described above, the lamination sheet S and the inner sheet P on which an on which an image is formed are conveyed to the sheet laminator 200a to receive the sheet laminating operation performed by the sheet laminator 200a.

According to the above-described configuration of the image forming system 3001 according to the present embodiment, the lamination sheet S stacked on the first sheet tray 160 of the image forming apparatus 300 is conveyed to the sheet laminator 200a via the sheet conveyance passage 164 and separate the lamination sheet S into two sheets in the sheet separation unit 1. Then, while the sheet laminator 200a performs a sheet separating operation on the lamination sheet S, the image forming apparatus 300 conveys the inner sheet P stacked on the second sheet tray 162 in the sheet conveyance passage 164, the secondary transfer device 174, the fixing device 176, and the sheet ejection device 178 to form an image on the inner sheet P. and then conveyed the inner sheet P to the sheet laminator 200a. Then, the sheet laminator 200a may also perform the sheet laminating operation on the lamination sheet S after inserting the inner sheet P on which an image is formed into the lamination sheet S separated into two sheets.

Next, descriptions are given of an image forming system including the sheet processing device according to an embodiment of the present disclosure and an image forming apparatus, according to a modification of the above-described embodiment.

Figure 26:
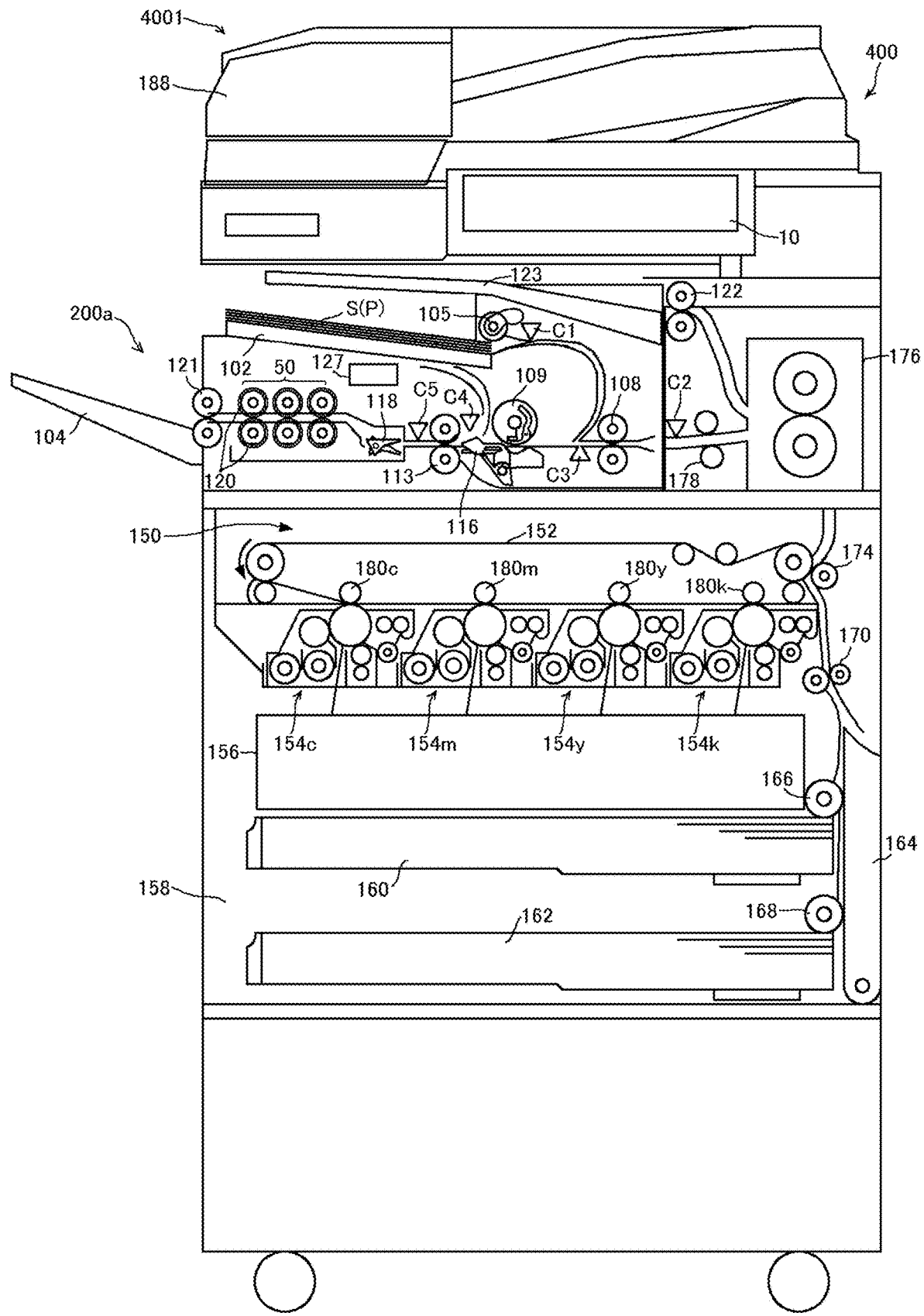
FIG. 26 is a diagram illustrating an overall configuration of an image forming system according to a modification of the present disclosure, including the sheet laminator and an image forming apparatus.

FIG. 26 is a diagram illustrating an overall configuration of an image forming system according to a modification of the present disclosure, including the sheet laminator and an image forming apparatus.

In an image forming system 4001 illustrated in FIG. 26, an image forming apparatus 400 is basically the same as the image forming apparatus 300 illustrated in FIG. 25. However, different from the image forming apparatus 300, the image forming apparatus 400 includes a second sheet ejection unit 122 and a sheet ejection tray 123.

When the sheet laminating operation is not performed, the image forming apparatus 400 may form an image on the inner sheet P fed from the second sheet tray 162, and then eject the inner sheet P having the image by the second sheet ejection unit 122 including a pair of sheet ejection rollers to the sheet ejection tray 123. Accordingly, when the sheet laminating operation is not performed, the image forming apparatus 400 does not need to decrease the output speed of image formation. For this reason, the image forming apparatus 400 can maintain the image formation productivity.

The image forming apparatus 400 may include the sheet laminator 200a detachably attached to the in-body sheet discharging section. In other words, when the sheet laminating operation is not performed, the sheet laminator 200a may be detached from the image forming apparatus 400.

In addition, the sheet laminator 200a thus detached from the image forming apparatus 400 may include the sheet tray 103 to stack the inner sheets P and the pickup roller 106 to feed the inner sheet P from the sheet tray 103, so that the sheet laminator 200a can be used as a single unit such as the sheet laminator 200 illustrated in FIG. 24.

The image forming system 3001 illustrated in FIG. 25 and the image forming system 4001 illustrated in FIG. 26 may include the sheet processing device 100 in an in-body sheet discharging section instead of including the sheet laminator 200a. The image forming system 4001 illustrated in FIG. 26 may include the sheet processing device 100 detachably attachable to the image forming system 4001.

Each of the image forming system 3001 illustrated in FIG. 25 and the image forming system 4001 illustrated in FIG. 26 may include a large-capacity sheet ejection device (stacker), a post-processing apparatus such as a binder unit, or both.

In a case where the lamination sheet S that is stacked on the first sheet tray 160 included in the image forming apparatus 300 illustrated in FIG. 25 or the image forming apparatus 400 illustrated in FIG. 26 passes through the fixing device 176, the lamination sheet S is not bonded at the fixing temperature but is bonded by application of heat higher than the fixing temperature. Although the image forming apparatus 300 illustrated in FIG. 25 and the image forming apparatus 400 illustrated in FIG. 26 employ electrophotography for image formation on the inner sheet P in the description above, the image formation method is not limited to the above-described configuration. For example, inkjet, stencil printing, or other known printing method may be employed to the image forming apparatus 300 or the image forming apparatus 400.

Figure 27:
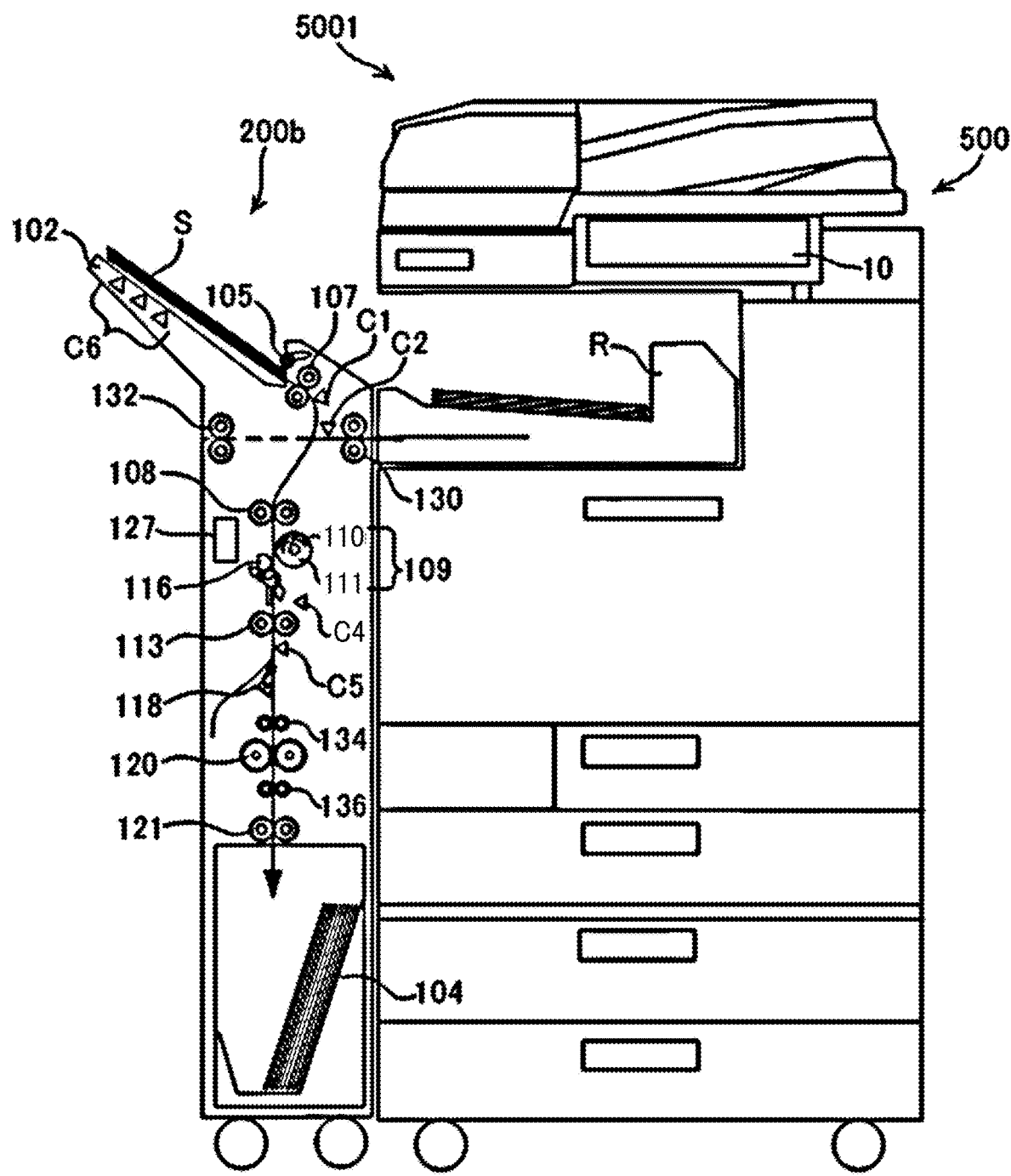
FIG. 27 is a diagram illustrating an overall configuration of an image forming system according to an embodiment of the present disclosure, including an image forming apparatus and the sheet laminator outside the image forming apparatus.

FIG. 27 is a diagram illustrating an overall configuration of an image forming system according to an embodiment of the present disclosure, including an image forming apparatus and the sheet laminator outside the image forming apparatus.

Figure 28:
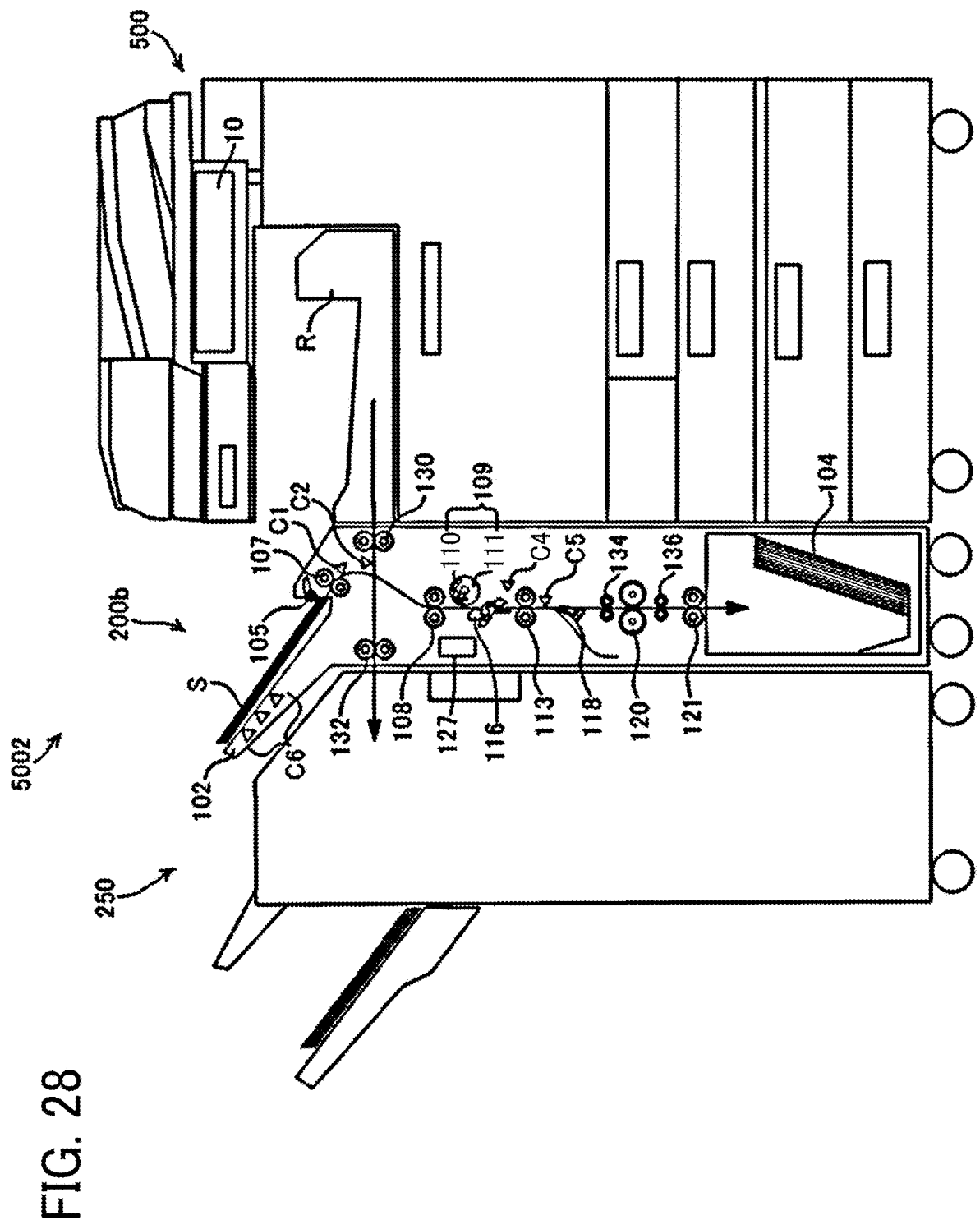
FIG. 28 is a diagram illustrating an overall configuration of another image forming system according to an embodiment of the present disclosure, including an image forming apparatus and the sheet laminator outside the image forming apparatus.

FIG. 28 is a diagram illustrating an overall configuration of another image forming system according to an embodiment of the present disclosure, including an image forming apparatus and the sheet laminator outside the image forming apparatus.

In FIGS. 27 and 28, elements identical to the elements of the image forming system 3001 illustrated in FIG. 25 and the elements of the image forming system 4001 illustrated in 26 are given identical reference numerals, and the descriptions these elements are omitted.

As illustrated in FIG. 27, an image forming system 5001 is basically same as the image forming system 3001 illustrated in FIG. 25 and the image forming system 4001 illustrated in FIG. 26. However, different from the image forming systems 3001 and 4001, the image forming system 5001 illustrated in FIG. 27 includes a sheet laminator 200*b* on the outside of an image forming apparatus 500.

The sheet laminator 200*b* includes the sheet tray 102 on which the lamination sheets S are stacked and has the configuration in which an inner sheet P can be fed from the image forming apparatus 500 via a relay conveyance device R. The sheet laminator 200*b* further includes the conveyance sensor C2 disposed downstream from an entrance roller pair 130 and upstream from an exit roller pair 132 in the sheet conveyance direction. The sheet laminator 200*b* further includes a sheet conveying roller pair 134 disposed upstream from the thermal fixing roller pair 120 and a sheet conveying roller pair 136 disposed downstream from the thermal fixing roller pair 120 in the sheet conveyance direction. Due to such a configuration, the image forming system 5001 can automatically perform any image forming operation on an inner sheet P with a copier or a printer (i.e., the image forming apparatus 500), a sheet separating operation on a lamination sheet S, a sheet inserting operation on the inner sheet P having an image into the separated lamination sheet S, and a sheet laminating operation on the lamination sheet S in which the inner sheet P is inserted.

The image forming system 5002 illustrated in FIG. 28 has a configuration in which another post-processing apparatus 250 is disposed further downstream from the sheet laminator 200*b* in the sheet conveyance direction of the lamination sheet S. This post-processing apparatus 250 includes, for example, a large-capacity sheet ejection device (stacker), a post-processing apparatus such as a binder, or both. According to the request of a user, the job performing the sheet laminating operation and the job not performing the sheet laminating operation can be performed in parallel, which can enhance the working efficiency.

Figure 29:
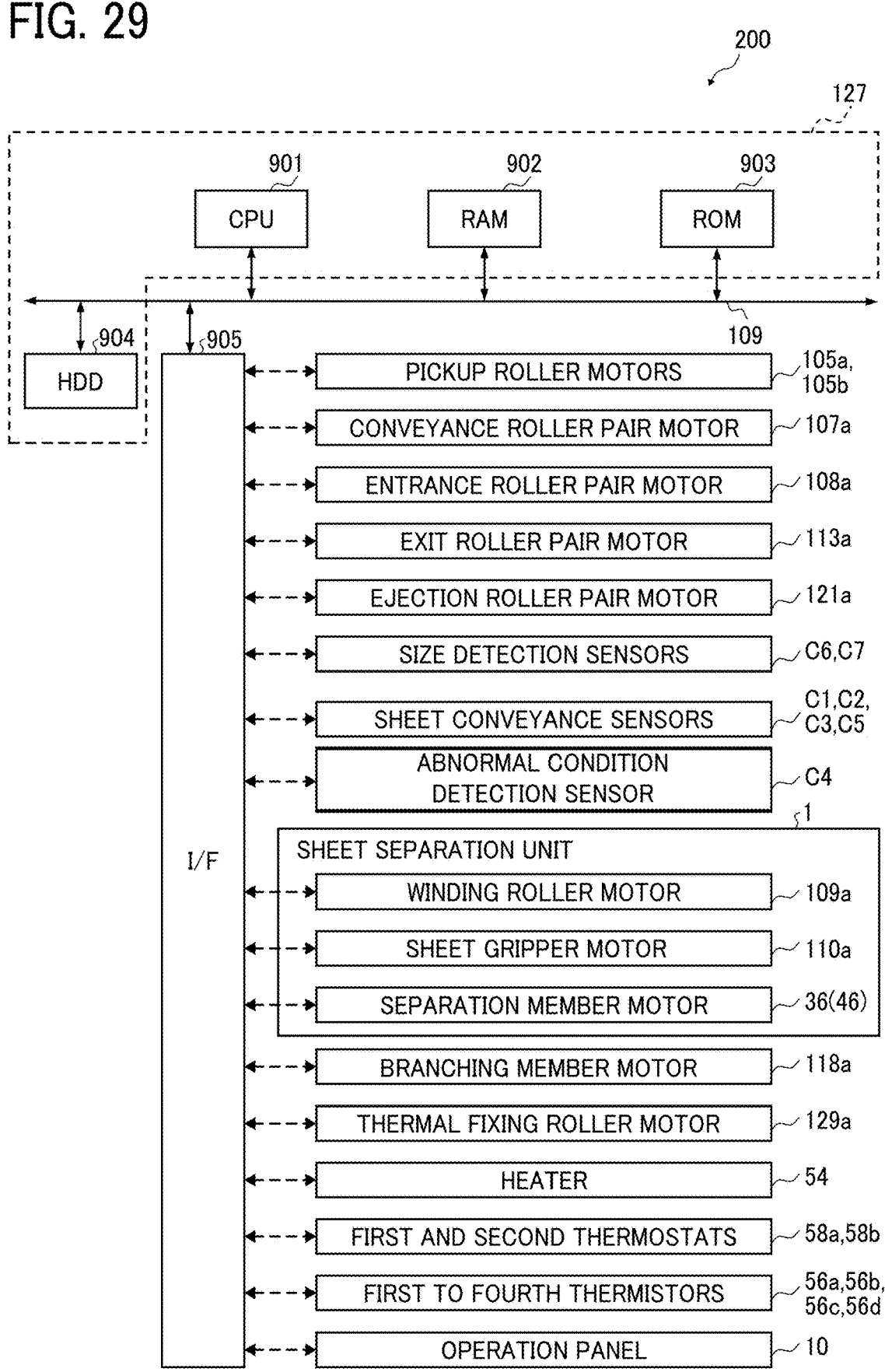
FIG. 29 is a block diagram illustrating a hardware configuration of a control block of the sheet laminator to control the operation of the sheet laminator.

FIG. 29 is a block diagram illustrating a hardware configuration of a control block of the sheet laminator 200 to control the operation of the sheet laminator 200.

As illustrated in FIG. 29, the sheet laminator 200 includes a central processing unit (CPU) 901, a random access memory (RAM) 902, a read only memory (ROM) 903, a hard disk drive (HDD) 904, and an interface (I/F) 905. The CPU 901, the RAM 902, the ROM 903, the HDD 904, and the I/F 905 are connected to each other.

The CPU 901 is an arithmetic unit and controls the overall operation of the sheet laminator 200.

The RAM 902 is a volatile storage medium that allows data to be read and written at high speed. The CPU 901 uses the RAM 902 as a work area for data processing.

The ROM 903 is a read-only non-volatile storage medium that stores programs such as firmware.

The HDD 904 is a non-volatile storage medium that allows data to be read and written and has a relatively large storage capacity. The HDD 904 stores, e.g., an operating system (OS), various control programs, and application programs.

The sheet laminator 200 processes, by an arithmetic function of the CPU 901, e.g., a control program stored in the ROM 903 and an information processing program (or application program) loaded into the RAM 902. Such processing configures a software controller including various functional modules of the sheet laminator 200. The software controller thus configured cooperates with hardware resources of the sheet laminator 200 to construct functional blocks to implement functions of the sheet laminator 200. In other words, the CPU 901, the RAM 902, the ROM 903, and the HDD 904 implement a controller 127 to control the operation of the sheet laminator 200.

The I/F 905 is an interface that connects a pickup roller motor 105*a*, a pickup roller motor 106*a*, a conveyance roller pair motor 107*a*, the entrance roller pair motor 108*a*, the exit roller pair motor 113*a*, an ejection roller pair motor 121*a*, the winding roller motor 109*a*, the sheet gripper motor 110*a*, the separation member motor 36 (46), a branching member motor 118*a*, a thermal fixing roller motor 129*a*, and a heater 54, to the controller 127. Further, the I/F 905 is an interface that connects the size detection sensors C6 and C7, the sheet conveyance sensors C1, C2, and C3, the abnormal condition detection sensor C4, a first thermostat 58*a*, a second thermostat 58*b*, a first thermistor 56*a*, a second thermistor 56*c*, a third thermistor 56*b*, a fourth thermistor 56*d*, and the operation panel 10, to the controller 127.

The controller 127 controls the operations of the pickup roller motors 105*a* and 106*a*, the conveyance roller pair motor 107*a*, the entrance roller pair motor 108*a*, the exit roller pair motor 113*a*, the ejection roller pair motor 121*a*, the winding roller motor 109*a*, the sheet gripper motor 110*a*, the separation member motor 36 (46), the branching member motor 118*a*, the thermal fixing roller motor 129*a*, and the heater 54, via the I/F 905. Further, the controller 127 acquires detection results from the size detection sensors C6 and C7, the sheet conveyance sensors C1, C2, C3, and C5, the abnormal condition detection sensor C4, the first thermostat 58*a*, the second thermostat 58*b*, the first thermistor 56*a*, the second thermistor 56*c*, the third thermistor 56*b*, and the fourth thermistor 56*d*.

The winding roller motor 109*a* is a driver to drive the winding roller 109 in the forward and reverse directions. The sheet gripper motor 110*a* is a driver to rotate the sheet gripper 110. The separation member motor 36 (46) is a driver to move the separation members 116 in the width direction of the lamination sheet S. The branching member motor 118a is a driver to switch the position of the branching member 118.

Figure 30A:
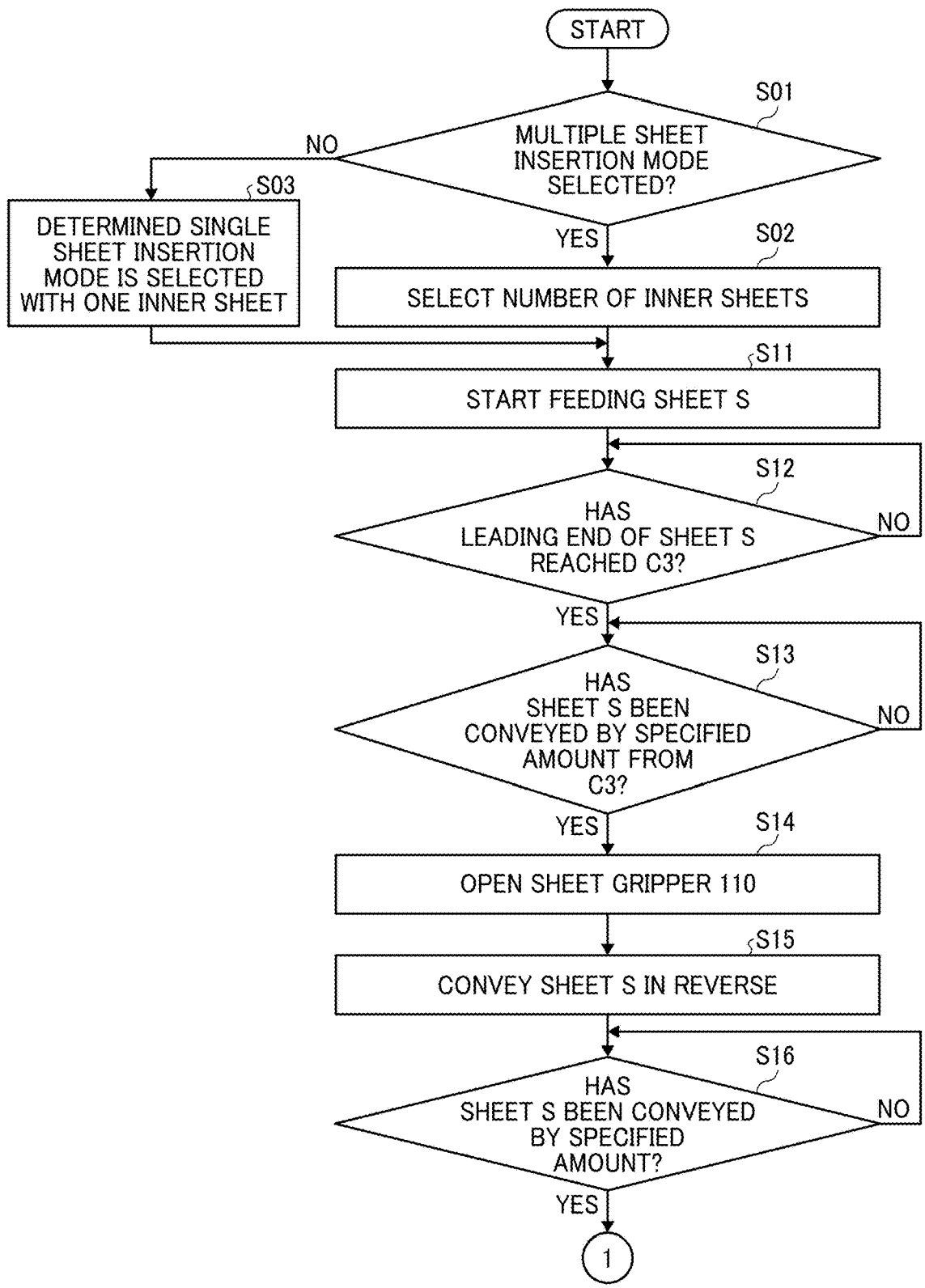
FIGS. 30A, 30B, and 30C is a flowchart of a series of operations performed by the sheet laminator from feeding a lamination sheet, inserting an inner sheet, and completing lamination of the lamination sheet with the inner sheet being inserted.
Figure 30B:
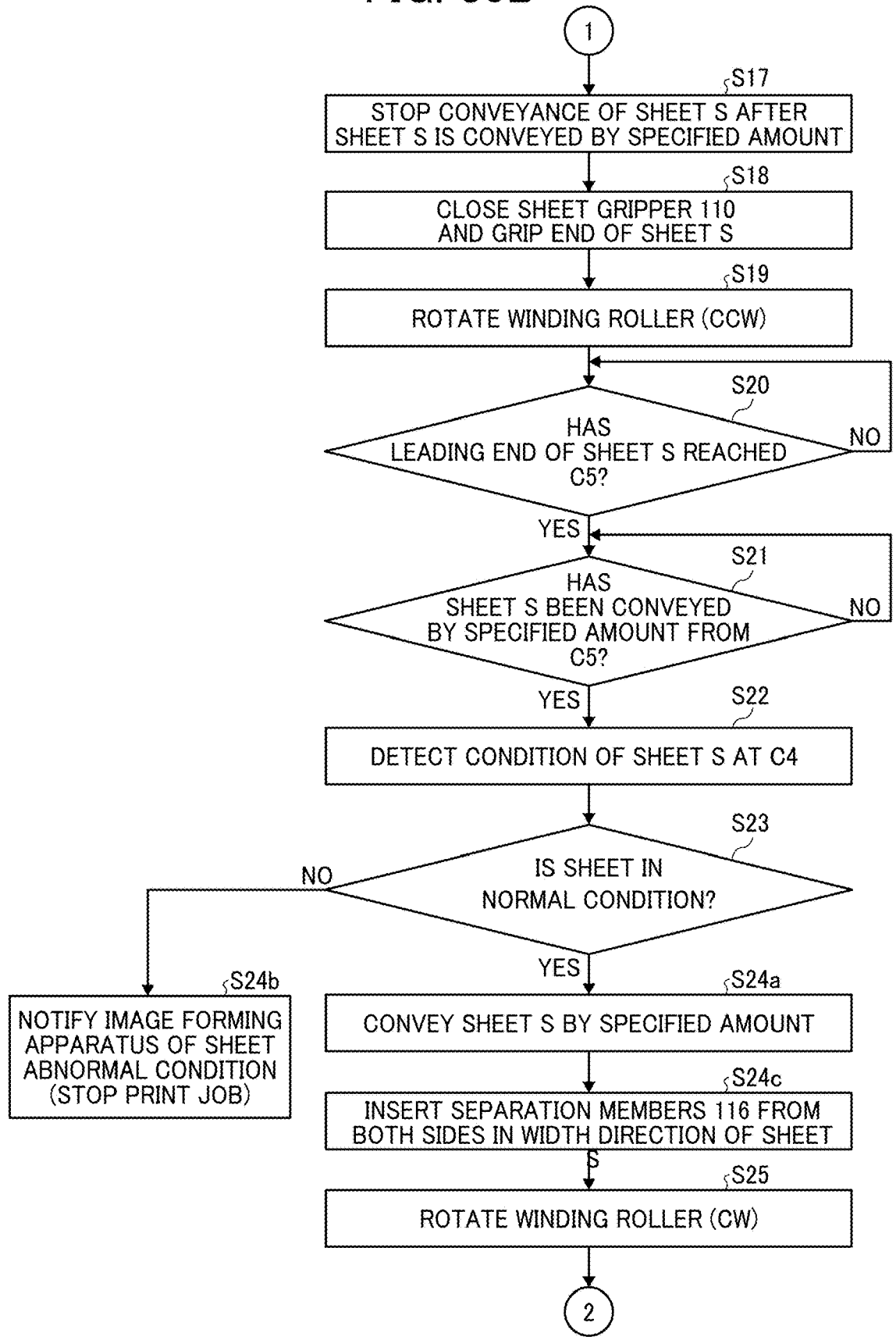
Figure 30C:
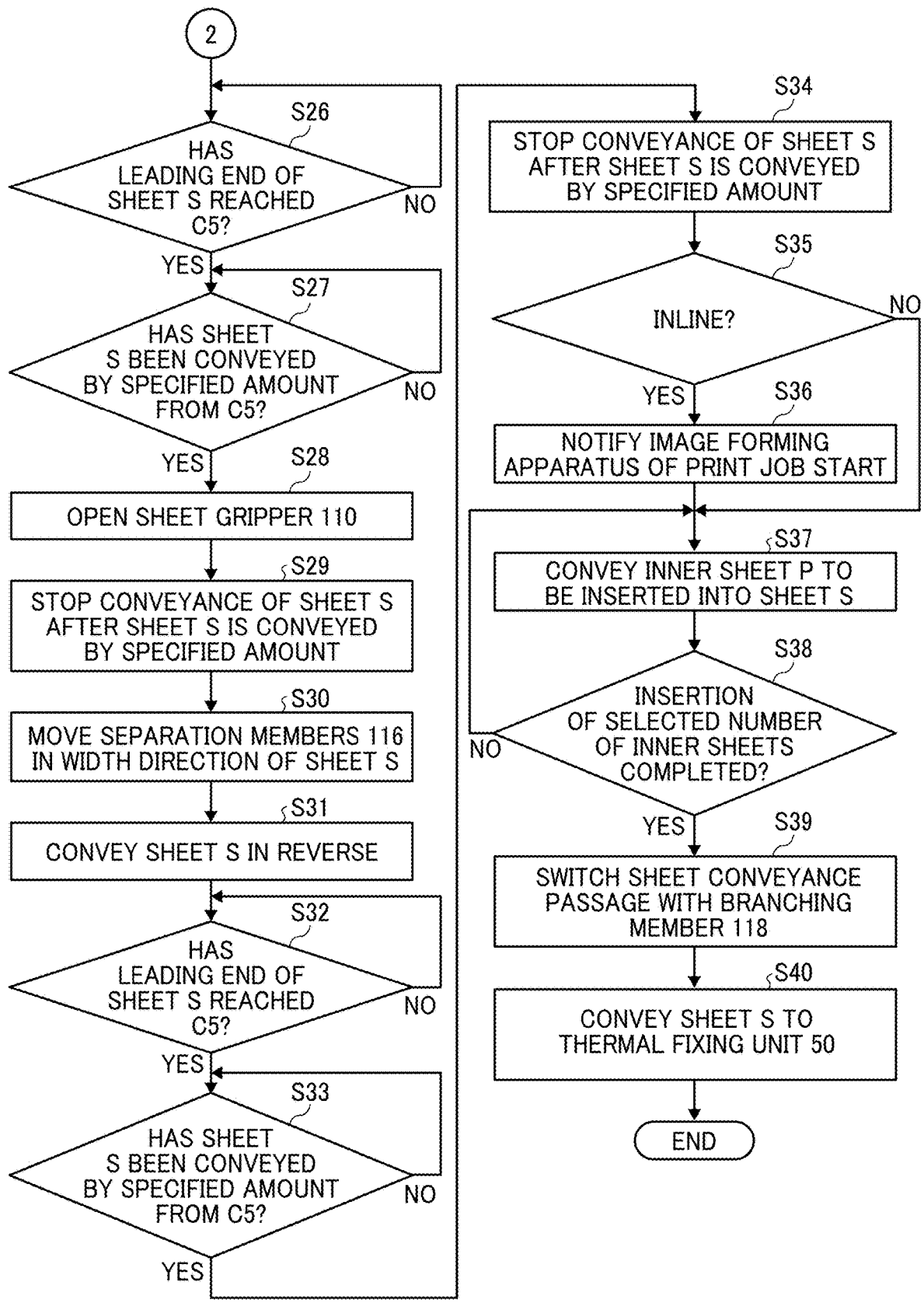

FIG. 30 including FIGS. 30A, 30B, and 30C is a flowchart of a series of operations performed by the image forming system 3001 illustrated in FIG. 25, from feeding a lamination sheet S, inserting an inner sheet P, and completing lamination of the lamination sheet S with the inner sheet P being inserted.

A description is given of the series of operations, with reference to the reference numerals indicated in the flowchart of FIG. 30 including FIGS. 30A, 30B, and 30C.

In the following description, only the sheet laminating operation in the image forming system 3001 illustrated in FIG. 25 is described. However, the sheet laminating operations in the image forming system 4001 illustrated in FIG. 26, the image forming system 5001 illustrated in FIG. 27, and the image forming system 5002 illustrated in FIG. 8 are similar to the image forming system 3001 illustrated in FIG. 25, and thus the detailed description is omitted.

First, in step S01, the image forming system 3001 determines whether a user has selected the multiple sheet insertion mode. When the user has selected the multiple sheet insertion mode (YES in step S01), the image forming system 3001 requests the user inputting the number of inner sheets in step S02. The number of inner sheets can be set by the user with, for example, the operation panel 10.

On the other hand, when the user has not selected the multiple sheet insertion mode (NO in step S01), the image forming system 3001 determines whether the user has selected the single sheet insertion mode with one inner sheet in step S03.

Subsequent to step S02 or step S03, the sheet laminator 200a starts feeding a lamination sheet S (see FIG. 1), in step S11. Then, in step S12, the sheet laminator 200a determines whether the leading end of the lamination sheet S has reached the sheet conveyance sensor C3 (see FIG. 2). In step S13, the sheet laminator 200a determines whether the lamination sheet S has been conveyed by the specified amount from the sheet conveyance sensor C3, and temporarily stops the conveyance (see FIG. 3). When the lamination sheet S has not been conveyed by the specified amount from the sheet conveyance sensor C3 (NO in step S13), step S13 is repeated until the lamination sheet S is conveyed by the specified amount from the sheet conveyance sensor C3. On the other hand, when the lamination sheet S has been conveyed by the specified amount from the sheet conveyance sensor C3 (YES in step S13), the sheet laminator 200a causes the sheet gripper motor 110a to open the sheet gripper 110 in step S14, and conveys the lamination sheet S in the reverse conveyance direction (i.e., the direction indicated by arrow B in FIG. 4) in step S15 (see FIG. 4).

Then, the sheet laminator 200a determines whether the lamination sheet S has been conveyed by the specified amount in step S16. When the lamination sheet S has not been conveyed by the specified amount (NO in step S16), step S16 is repeated until the lamination sheet S is conveyed by the specified amount. On the other hand, when the lamination sheet S has been conveyed by the specified amount (YES in step S16), the sheet laminator 200a temporarily stops the conveyance in step S17. Then, in step S18, the sheet laminator 200a causes the sheet gripper motor 110a to close the sheet gripper 110 to nip the end of the lamination sheet S (see FIG. 5).

Then, in step S19, the sheet laminator 200a causes the winding roller motor 109a to rotate the winding roller 109 in the counterclockwise direction, so that the lamination sheet S is would around the winding roller 109 (see FIG. 6). In step S20, the sheet laminator 200a determines whether the leading end of the lamination sheet S has reached at the sheet conveyance sensor C5. When the leading end of the lamination sheet S has not reached the sheet conveyance sensor C5 (NO in step S20), step S20 is repeated until the leading end of the lamination sheet S reaches the sheet conveyance sensor C5. By contrast, when the leading end of the lamination sheet S has reached the sheet conveyance sensor C5 (YES in step S20), the sheet laminator 200a then executes the operation of step S21. In step S21, the sheet laminator 200a determines whether the lamination sheet S has been conveyed by the specified amount from the sheet conveyance sensor C5. When the lamination sheet S has not been conveyed by the specified amount from the sheet conveyance sensor C5 (NO in step S21), step S21 is repeated until the lamination sheet S is conveyed by the specified amount from the sheet conveyance sensor C5. By contrast, when the lamination sheet S has been conveyed by the specified amount from the sheet conveyance sensor C5 (YES in step S21), the sheet laminator 200a detects the condition of the lamination sheet S with the abnormal condition detection sensor C4 in step S22.

The abnormal condition detection sensor C4 is an abnormal condition detector that detects whether the dimension of the space g created between the two sheets of the lamination sheet S (the amount of bending of one of the two sheets) exceeds the predetermined threshold. In step S23, the sheet laminator 200a determines whether the lamination sheet S is in a normal condition, in other words, the size of the space g is equal to or greater than the given threshold, from the detection result of the abnormal condition detection sensor C4. When the sheet laminator 200a determines that the lamination sheet S is in a normal condition (i.e., the size of the space g is equal to or greater than the given threshold) from the detection result of the abnormal condition detection sensor C4 (YES in step S23), the sheet laminator 200a then executes the operation of step S24a.

On the other hand, when the sheet laminator 200a determines that the lamination sheet S is in an abnormal condition (i.e., the size of the space g is smaller than the given threshold) from the detection result of the abnormal condition detection sensor C4 (NO in step S23), the sheet laminator 200a notifies the user of the abnormal condition and stops the sheet processing operation in step S24b.

In step S24a, the sheet laminator 200a conveys the lamination sheet S by the specified amount in a direction opposite to the sheet winding direction (i.e., the direction indicated by arrow A in FIG. 2), so that the bonded portion r of the lamination sheet S is located downstream from the nip region of the exit roller pair 113. Accordingly, the space g created between the two sheets of the lamination sheet S can be formed at a position corresponding to the insertion position of the separation members 116.

After step S24a, the sheet laminator 200a executes the operation of step S24c. In step S24c, the sheet laminator 200a causes the separation member motor 36 to inserts the separation members 116 from both sides of the lamination sheet S into the space g created between the two sheets of the lamination sheet S (see FIGS. 7 and 20). Then, in step S25, the sheet laminator 200a causes the winding roller motor 109a to rotate the winding roller 109 in the clockwise direction with the separation members 116 inserted from both sides of the lamination sheet S, and convey the lamination sheet S in the forward conveyance direction (i.e., the direction indicated by arrow A in FIG. 2).

Then, in step S26, the sheet laminator 200a determines whether the leading end of the lamination sheet S has reached the sheet conveyance sensor C5. When the leading end of the lamination sheet S has not reached the sheet conveyance sensor C5 (NO in step S26), step S26 is repeated until the leading end of the lamination sheet S reaches the sheet conveyance sensor C5. By contrast, when the leading end of lamination sheet S has reached the sheet conveyance sensor C5 (YES in step S26), the sheet laminator 200a executes the operation of step S27. In step S27, the sheet laminator 200a determines whether the lamination sheet S has been conveyed by the specified amount from the sheet conveyance sensor C5. When the lamination sheet S has not been conveyed by the specified amount from the sheet conveyance sensor C5 (NO in step S27), step S27 is repeated until the lamination sheet S is conveyed by the specified amount from the sheet conveyance sensor C5. By contrast, when the lamination sheet S has been conveyed by the specified amount from the sheet conveyance sensor C5 (YES in step S27), the sheet laminator 200a the sheet gripper motor 110a to open the sheet gripper 110 in step S28.

In step S29, the sheet laminator 200a conveys the lamination sheet S by the specified amount, then temporarily stops the conveyance of the lamination sheet S. Then, in step S30, the sheet laminator 200a causes the separation member motor 36 to further move the separation members 116 in the sheet width direction of the lamination sheet S (see FIGS. 8 and 22). As a result, the trailing ends of the two sheets of the lamination sheet S are separated into the upper and lower sheets.

In step S31, the sheet laminator 200a conveys the lamination sheet S in the reverse conveyance direction (i.e., the direction indicated by arrow B in FIG. 9). Then, in step S32, the sheet laminator 200a determines whether the leading end of the lamination sheet S in the forward conveyance direction has reached the sheet conveyance sensor C5. When the leading end of the lamination sheet S has not reached the sheet conveyance sensor C5 (NO in step S32), step S32 is repeated until the leading end of the lamination sheet S reaches the sheet conveyance sensor C5. By contrast, when the leading end of lamination sheet S has reached the sheet conveyance sensor C5 (YES in step S32), the sheet laminator 200a then executes the operation of step S33. In step S33, the sheet laminator 200a determines whether the lamination sheet S has been conveyed by a specified amount from the sheet conveyance sensor C5. When the lamination sheet S has not been conveyed by the specified amount from the sheet conveyance sensor C5 (NO in step S33), step S33 is repeated until the lamination sheet S is conveyed by the specified amount from the sheet conveyance sensor C5. By contrast, when the lamination sheet S has been conveyed by the specified amount from the sheet conveyance sensor C5 (YES in step S33), the sheet laminator 200a temporarily stops the conveyance of the lamination sheet S in step S34 (see FIG. 9). As a result, the separation of the lamination sheet S is completed.

Subsequently, in step S35, the sheet laminator 200a determines whether or not to perform the image forming operation (with an inline image forming apparatus) on the inner sheet P to be inserted into the lamination sheet S. When the image forming operation is performed with an inline image forming apparatus (YES in step S35), the sheet laminator 200a sends a signal to notify the inline image forming apparatus, for example, the image forming apparatus 300 (or the image forming apparatus 400 or the image forming apparatus 500) to start the print job (printing operation) to form an image on the inner sheet P in step S36. Then, the sheet laminator 200a executes the operation of step S37.

By contrast, when the image forming operation is not performed with an inline image forming apparatus (NO in step S35), the sheet laminator 200a then executes the operation of step S37.

In step S37, the sheet laminator 200a conveys the inner sheet P in the forward conveyance direction (i.e., the direction indicated by arrow A in FIG. 10), so as to insert the inner sheet P into the opening of the lamination sheet S. In step S37, when the single sheet insertion mode is selected, the sheet laminator 200a performs the operations illustrated in FIGS. 10 to 12. On the other hand, when the multiple sheet insertion mode is selected, the sheet laminator 200a performs the operations illustrated in FIGS. 13 to 16.

In step S38, the sheet laminator 200a determines whether the selected number of inner sheets P are inserted into the lamination sheet S. When the selected number of inner sheets P are not inserted into the lamination sheet S (NO in step S38), step S38 is repeated until the selected number of inner sheets P are inserted into the lamination sheet S. On the other hand, when the selected number of inner sheets P are inserted into the lamination sheet S (YES in step S38), the sheet laminator 200a then executes the operation of step S39.

Then, in step S39, the sheet laminator 200a causes the branching member motor 118a to rotate the branching member 118 to switch (change) the sheet conveyance passage of the lamination sheet S. In step S40, the sheet laminator 200a conveys the lamination sheet S sandwiching the inner sheet P to the thermal fixing unit 50. By application of heat and pressure to the lamination sheet S, the sheet laminating operation completes (see FIG. 17).

When the image forming operation is performed with an inline image forming apparatus (YES in step S35), the sheet laminator 200a sends a signal to notify the inline image forming apparatus, for example, the image forming apparatus 300 (or the image forming apparatus 400 or the image forming apparatus 500) to start the print job, then performs the printing operation on the inner sheet P and conveys the inner sheet P. In this case, the sheet processing device waits until the printed inner sheet P is conveyed and reaches the sheet conveyance sensor C1. The sheet laminator 200a may send the image forming apparatus 300 (or the image forming apparatus 400 or the image forming apparatus 500) the signal to start the print job in advance based on a time to convey the printed inner sheet P, for example, after the separation members 116 complete the operations illustrated in FIG. 7. Due to such a configuration, the productivity can be enhanced.

A description is now given of the detailed configuration of the sheet laminator according to an embodiment of the present disclosure.

Figure 31:
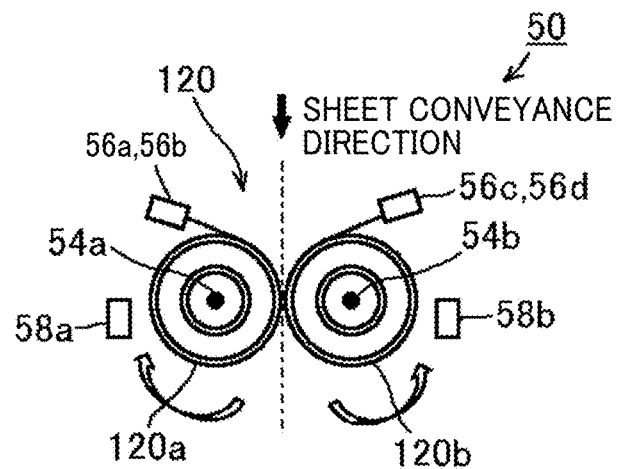
FIG. 31 is a diagram illustrating a configuration of a thermal fixing unit included in the sheet laminator according to an embodiment of the present disclosure.

FIG. 31 is a diagram illustrating a configuration of a thermal fixing unit 50 included in the sheet laminator 200 (200a, 200b) according to an embodiment of the present disclosure.

The thermal fixing unit 50 applies heat and pressure on the lamination sheet S sandwiching the inner sheet P while conveying the lamination sheet S. The lamination sheet S sandwiching the inner sheet P is hereinafter referred to as a "sheet SP". The thermal fixing unit 50 includes a thermal fixing roller pair 120, a heater 54, and a thermal fixing roller motor 129a (see FIG. 29). The thermal fixing roller pair 120 includes a first thermal fixing roller 120a and a second thermal fixing roller 120b to convey the sheet SP. The heater 54 includes a first heater 54a and a second heater 54b to heat the first thermal fixing roller 120a and the second thermal fixing roller 120b of the thermal fixing roller pair 120. The thermal fixing roller motor 129a heats the first thermal fixing roller 120a and the second thermal fixing roller 120b of the thermal fixing roller pair 120 (see FIG. 29). The thermal fixing unit 50 further includes thermistors 56 (i.e., the first thermistor 56a, the second thermistor 56c, the third thermistor 56b, and the fourth thermistor 56d) and thermostats 58 (i.e., the first thermostat 58a and the second thermostat 58b). Each of the thermistors 56 detect the surface temperature of the thermal fixing roller pair 120. The thermostats 58 disconnect the heaters 54 at a temperature equal to or higher than a certain value.

Figure 32:
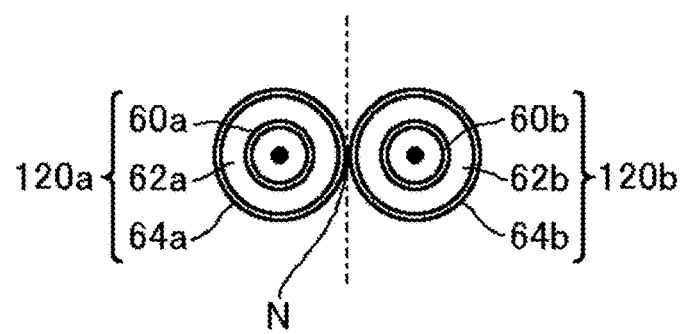
FIG. 32 is a schematic diagram illustrating a configuration of a thermal fixing roller pair according to an embodiment of the present disclosure.

FIG. 32 is a schematic diagram illustrating a configuration of the thermal fixing roller pair according to an embodiment of the present disclosure.

As illustrated in FIG. 32, the first thermal fixing roller 120a of the thermal fixing roller pair 120 includes a core metal portion 60a at a center portion of the first thermal fixing roller 120a, an elastic layer 62a (i.e., a rubber layer) disposed around the core metal portion 60a, and a fluororesin layer 64a on the surface of the elastic layer 62a. The second thermal fixing roller 120b of the thermal fixing roller pair 120 includes a core metal portion 60b at a center portion of the second thermal fixing roller 120b, an elastic layer 62b (i.e., a rubber layer) disposed around the core metal portion 60b, and a fluororesin layer 64b on the surface of the elastic layer 62b. The elastic layers 62a and 62b (i.e., rubber layers) are crushed to form the nip portion N. The fluororesin layers 64a and 64b on the surfaces of the elastic layers 62a and 62b, respectively, can make it difficult for the adhesive leaked from the sheet SP to adhere to the surfaces of the first thermal fixing roller 120a and the second thermal fixing roller 120b of the thermal fixing roller pair 120.

The first thermal fixing roller 120a and the second thermal fixing roller 120b have the same diameter or substantially the same diameter and the same hardness or substantially the same hardness. Further, the first thermal fixing roller 120a and the second thermal fixing roller 120b have identical or substantially identical surface releasability.

Figure 33:
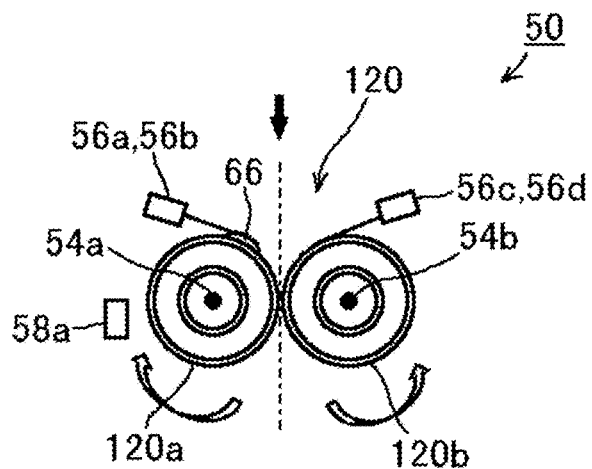
FIG. 33 is a schematic diagram illustrating a state where a thermistor is lifted due to adhesive accumulated on the surface of a roller of the thermal fixing roller pair.

FIG. 33 is a schematic diagram illustrating a state where the first thermistor 56a and the third thermistor 56b are lifted due to adhesive accumulated on the surface of the thermal fixing roller pair 120.

For example, during the sheet laminating operation, the adhesive leaking from the trailing end of the sheet SP adheres to and accumulates on the surface of the first thermal fixing roller 120a. In addition, when the sheets SP are continuously fed or the sheets SP having a large amount of glue are used, accumulation of the adhesive is promoted. When the accumulated adhesive 66 increases, the thermistors 56 are lifted from the surface of the first thermal fixing roller 120a, and an accurate upper temperature cannot be detected.

The first heater 54a and the second heater 54b are subjected to temperature control (feedback control) based on the surface temperatures of the first thermal fixing roller 120a and the second thermal fixing roller 120b detected by the corresponding thermistors 56 (i.e., the first thermistor 56a, the second thermistor 56c, the third thermistor 56b, and the fourth thermistor 56d). For this reason, if the thermistors 56 cannot detect the accurate surface temperatures, the temperatures of the first heater 54a and the second heater 54b cannot be appropriately controlled, and the qualities of sheet lamination are likely to deteriorate.

Further, even when the first heater 54a and the second heater 54b are heated, the detected surface temperatures of the first thermal fixing roller 120a and the second thermal fixing roller 120b remain low. In such a case, the first heater 54a and the second heater 54b are further heated to excessively increase the surface temperatures of the first heater 54a and the second heater 54b, which is likely to lead to smoke and fire.

Figure 34:
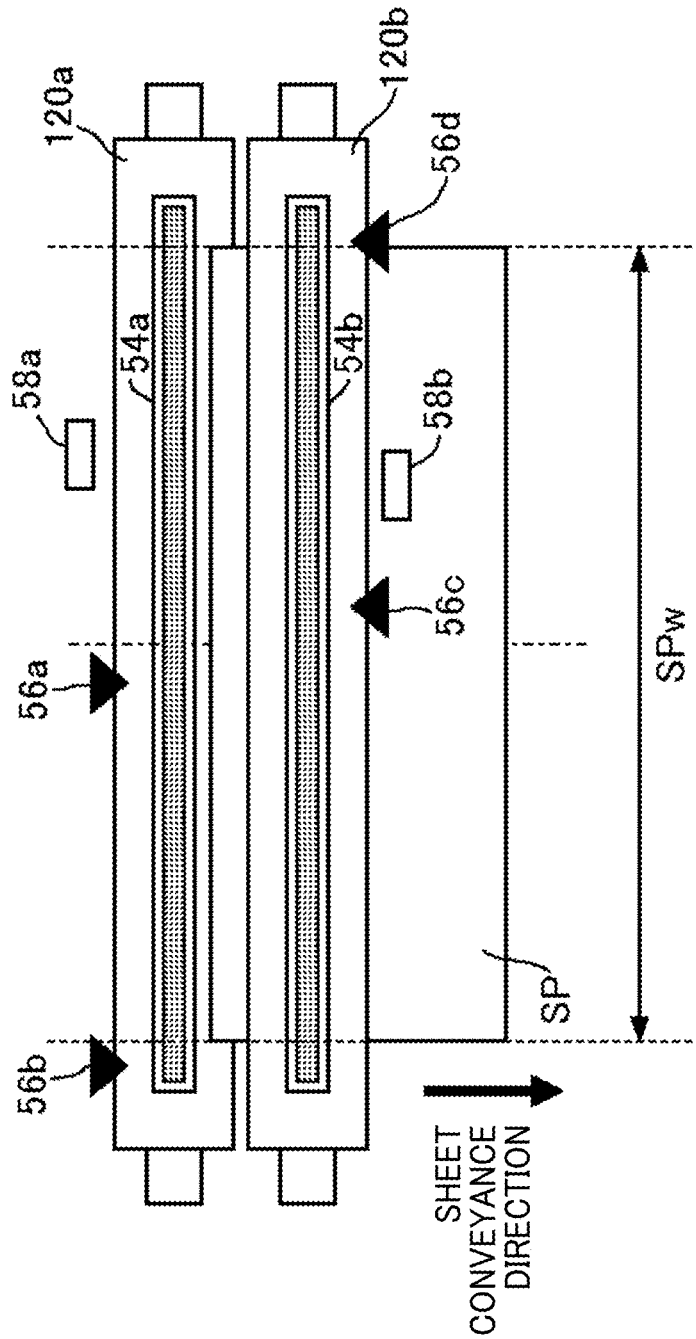
FIG. 34 is a diagram illustrating relative positions of the thermal fixing roller pair according to an embodiment of the present disclosure, and the thermistors and thermostats disposed on the thermal fixing roller pair.

FIG. 34 is a diagram illustrating the relative positions of the thermal fixing roller pair 120 according to an embodiment of the present disclosure, the thermistors 56 and the thermostats 58 disposed on the thermal fixing roller pair 120.

As illustrated in FIG. 34, the first thermistor 56a is disposed at the center portion in the axial direction of the first thermal fixing roller 120a, and the third thermistor 56b is disposed at an end in the axial direction of the first thermal fixing roller 120a. On the other hand, the second thermistor 56c is disposed at the center portion in the axial direction of the second thermal fixing roller 120b, and the fourth thermistor 56d is disposed at an end in the axial direction of the second thermal fixing roller 120b.

The temperatures detected with the first thermistor 56a, the second thermistor 56c, the third thermistor 56b, and the fourth thermistor 56d are monitored by a controller 127 (see FIG. 29) that controls the operations of the sheet laminator.

Further, the first thermostat 58a is disposed facing the first thermal fixing roller 120a, and the second thermostat 58b is disposed facing the second thermal fixing roller 120b.

The first thermistor 56a, the second thermistor 56c, the third thermistor 56b, and the fourth thermistor 56d are examples of first to fourth temperature detectors, respectively. Further, the first thermostat 58a and the second thermostat 58b are examples of first and second excessive temperature rise preventers.

Configurations of First to Fourth Thermistors

In the present embodiment, temperature control is performed with the first thermistor 56a and the second thermistor 56c disposed at the center portion in the axial direction of the thermal fixing roller pair 120, so that the surface temperature of the first thermal fixing roller 120a and the surface temperature of the second thermal fixing roller 120b reach the target temperatures. The first thermistor 56a and the second thermistor 56c are disposed separate (different) positions displaced from each other in the axial direction on the respective thermal fixing rollers facing each other included in the thermal fixing roller pair 120.

Even if, for example, adhesive accumulates on the first thermal fixing roller 120a and the first thermistor 56a is lifted, the second thermistor 56c that is disposed at a separate position in the axial direction with respect to the first thermal fixing roller 120a is less susceptible to the accumulated adhesive.

Similarly, the third thermistor 56b and the fourth thermistor 56d are disposed separate (different) positions displaced from each other in the axial direction on the respective thermal fixing rollers facing each other included in the thermal fixing roller pair 120. The third thermistor 56b and the fourth thermistor 56d are disposed outside a sheet passage region SPw of the sheet SP (i.e., the range is outside the sheet conveyance area) as illustrated in FIG. 34.

Since the third thermistor 56b and the fourth thermistor 56d are disposed outside a sheet passage region SPw of the sheet SP, the sheet SP does not pass the region. Due to such a configuration, the third thermistor 56b and the fourth thermistor 56d are less likely to receive the adhesive separated from the sheet SP. In other words, the third thermistor 56b and the fourth thermistor 56d are less likely to be lifted due to the accumulation of the adhesive. As a result, even if the first thermistor 56*a* and the second thermistor 56*c* that are disposed at the center portion in the axial direction of the thermal fixing roller pair 120 fail to accurately detect the surface temperature of the first thermal fixing roller 120*a* and the second thermal fixing roller 120*b*, the third thermistor 56*b* and the fourth thermistor 56*d* that are disposed at the end in the axial direction of the thermal fixing roller pair 120 can accurately detect the surface temperature of the first thermal fixing roller 120*a* and the second thermal fixing roller 120*b*.

In the present embodiment illustrated in FIG. 34, the first thermal fixing roller 120*a* is heated by a single heater, i.e., the first heater 54*a* and the second thermal fixing roller 120*b* is heated by a single heater, i.e., the second heater 54*b*. Due to such a configuration, the temperatures at the ends of the first thermal fixing roller 120*a* and the second thermal fixing roller 120*b* are lower than the temperatures at the centers of the first thermal fixing roller 120*a* and the second thermal fixing roller 120*b* in a state where heating is sufficiently performed.

It is preferable to store, in advance as data, the relation of difference in the temperatures at the center and the end in the axial direction of the thermal fixing roller pair 120. In such a case, even if the first thermistor 56*a* and the second thermistor 56*c* that are disposed at the center in the axial direction of the thermal fixing roller pair 120 do not function, the temperature at the center in the axial direction of the thermal fixing roller pair 120 can be estimated with the third thermistor 56*b* and the fourth thermistor 56*d* that are disposed at the end in the axial direction of the thermal fixing roller pair 120.

For example, when the first thermistor 56*a* and the second thermistor 56*c* no longer function, the temperatures of the first thermal fixing roller 120*a* and the second thermal fixing roller 120*b* can be controlled with the third thermistor 56*b* and the fourth thermistor 56*d*.

When the temperatures of the third thermistor 56*b* and the fourth thermistor 56*d* exceed certain thresholds while being monitored, the first heater 54*a*, the second heater 54*b*, or both may be turned off on the assumption that the temperature at the center in the axial direction of the first thermal fixing roller 120*a* and the second thermal fixing roller 120*b* are in the abnormal condition.

Configurations of First and Second Thermostats

The sheet laminator according to the present embodiment further includes the first thermostat 58*a* that detects the ambient temperature of the first thermal fixing roller 120*a* and disconnects the first heater 54*a* when the ambient temperature is equal to or higher than the threshold. The sheet laminator according to the present embodiment further includes the second thermostat 58*b* that detects the ambient temperature of the second thermal fixing roller 120*b* and disconnects the second heater 54*b* when the ambient temperature is equal to or higher than the threshold.

The temperatures detected by the first thermistor 56*a*, the second thermistor 56*c*, the third thermistor 56*b*, and the fourth thermistor 56*d* are monitored by the controller 127 that controls the operations of the sheet laminator. When the temperatures are equal to or higher than given temperatures (thresholds), the controller 127 determines that the abnormal temperatures are detected, and the heaters 54 (i.e., the first heater 54*a* and the second heater 54*b*) are stopped.

As the set thresholds of the first thermistor 56*a*, the second thermistor 56*c*, the third thermistor 56*b*, and the fourth thermistor 56*d* are lower than the set thresholds of the first thermostat 58*a* and the second thermostat 58*b*, the determination of the abnormal temperature is basically performed in the order of the thermistors and the thermostats. However, the thermistor cannot correctly detect the temperature due to lifting or disconnection of the thermistor or thermistors caused by accumulation of the adhesive. In this case, the safety of the sheet laminator can be ensured by the operation of the thermostat or the thermostats.

Figure 35:
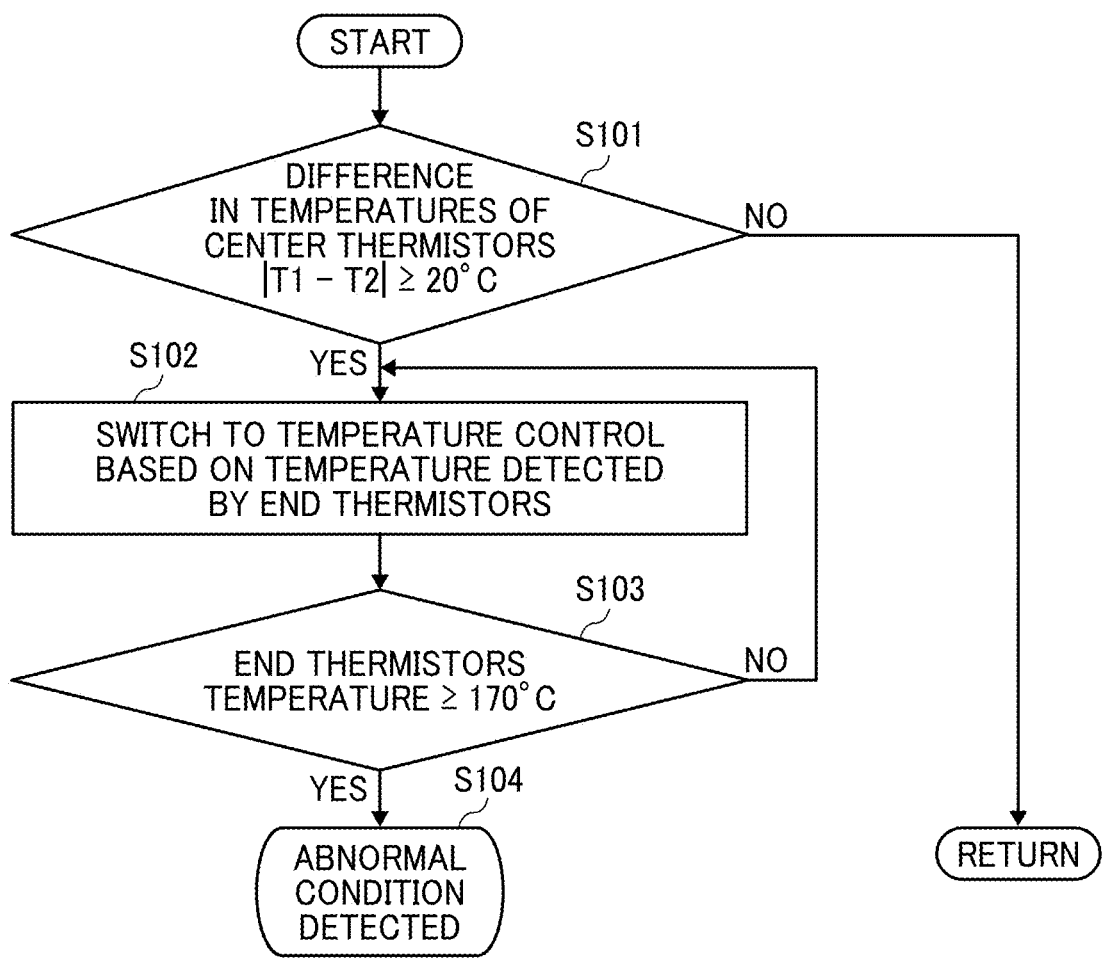
FIG. 35 is a flowchart of the flow of determination of an abnormal temperature.

FIG. 35 is a flowchart of the flow of determination of the abnormal temperature. First, in step S101, the controller 127 of the sheet laminator determines whether the absolute value of the temperature difference between the first thermistor 56*a* and the second thermistor 56*c* (in other words, center thermistors) disposed at the center in the axial direction of the thermal fixing roller pair 120 is equal to or higher than 20° C.

When the temperature is equal to or higher than 20° C. (YES in step S101), the controller 127 determines, in step S102, that the first thermistor 56*a* and the second thermistor 56*c* are in the abnormal condition and switches to the temperature control based on the temperatures detected by the third thermistor 56*b* and the fourth thermistor 56*d* (in other words, end thermistors) disposed at the end in the axial direction of the thermal fixing roller pair 120. Thereafter, the controller 127 of the sheet laminator executes step S103.

When the temperature is lower than 20° C. (NO in step S101), the controller 127 determines that the first thermistor 56*a* and the second thermistor 56*c* are in the normal condition (returns to the beginning of the flow).

In step S103, the controller 127 determines whether the temperature of the third thermistor 56*b* and the fourth thermistor 56*d* that are disposed at the ends in the axial direction of the thermal fixing roller pair 120 or the temperature of the third thermistor 56*b* or the fourth thermistor 56*d* is equal to or higher than 170° C.

When the temperature of the third thermistor 56*b* and the fourth thermistor 56*d* that are disposed at the ends in the axial direction of the thermal fixing roller pair 120 or the temperature of the third thermistor 56*b* or the fourth thermistor 56*d* is equal to or higher than 170° C. (YES in step S103), the controller 127 determines, in step S104, that the thermal fixing unit 50 is in the abnormal condition and performs the operation to remove the abnormal condition.

If the temperature is lower than 170° C. (NO in step S103), the process returns to step S102 again, and the temperature control based on the temperatures detected by the third thermistor 56*b* and the fourth thermistor 56*d* is continued.

As described above, in the present embodiment, even if the first thermistor 56*a* and the second thermistor 56*c* that are disposed at the center in the axial direction of the thermal fixing roller pair 120 are no longer functionable, the abnormal condition can be detected with the third thermistor 56*b* and the fourth thermistor 56*d* that are disposed at the ends in the axial direction of the thermal fixing roller pair 120.

Referring now to FIGS. 36 to 39, descriptions are given of the thermal fixing unit according to modifications of the above-described embodiments of the present disclosure.

Figure 36:
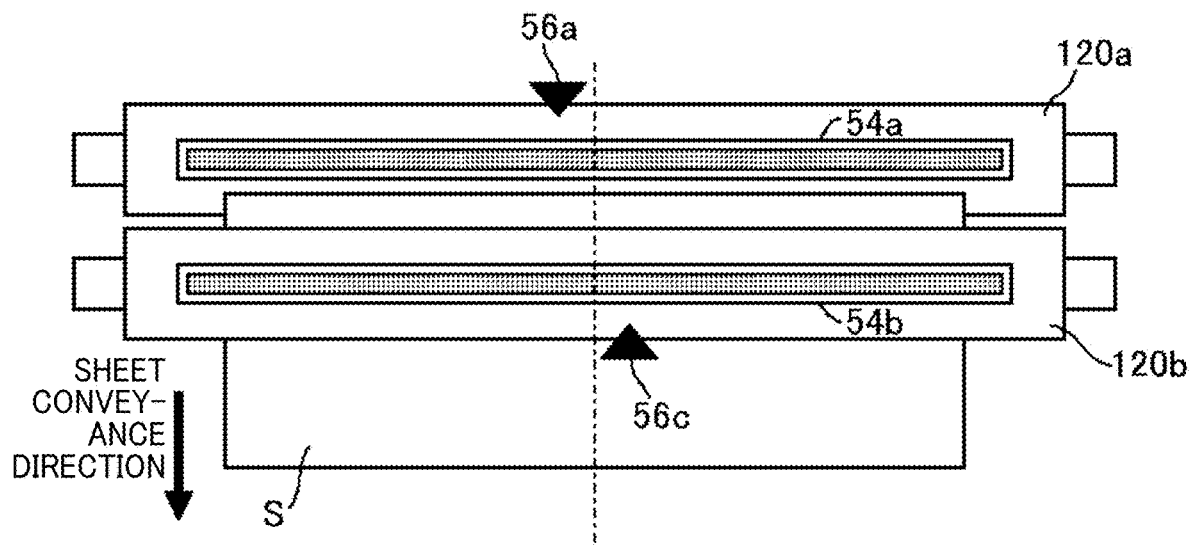
FIG. 36 is a diagram illustrating a configuration of a thermal fixing unit according to a first modification of the present disclosure.

FIG. 36 is a diagram illustrating a configuration of the thermal fixing unit 50 according to a first modification of the present disclosure.

As illustrated in FIG. 36, the first thermistor 56*a* is disposed at the center in the axial direction of the first thermal fixing roller 120*a*, and the second thermistor 56*c* is disposed at the center in the axial direction of the second thermal fixing roller 120*b*.

The first thermistor 56*a* and the second thermistor 56*c* are disposed separate positions displaced from each other in the axial direction on the respective thermal fixing rollers facing each other included in the thermal fixing roller pair 120. In this case, even if one of the thermistors (for example, the first thermistor 56a) does not function, the temperature of the center in the axial direction of the thermal fixing roller pair 120 can be detected by the other thermistor (for example, the second thermistor 56c).

Figure 37:
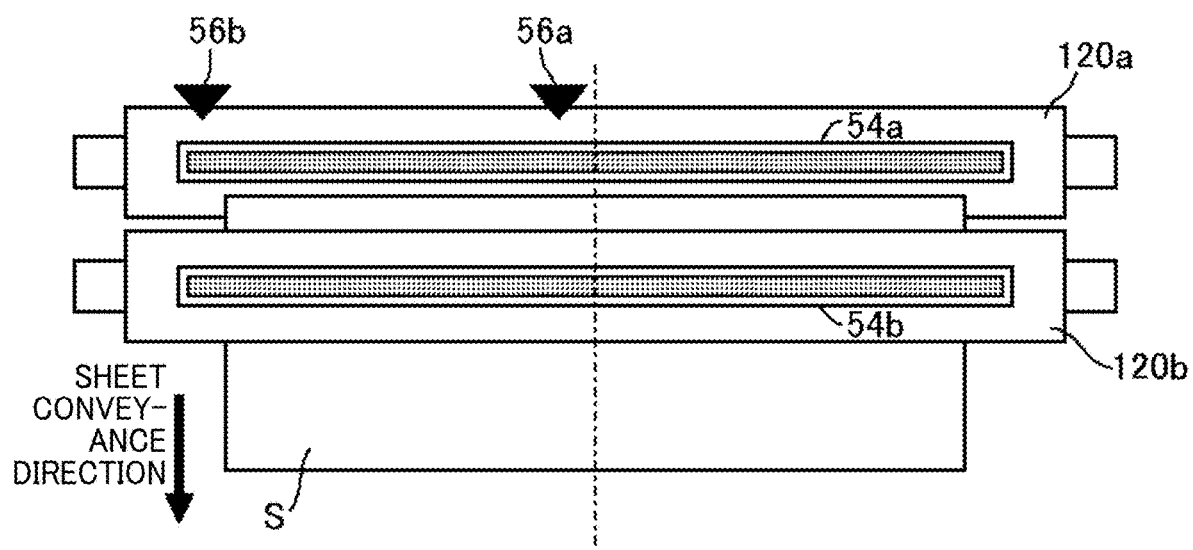
FIG. 37 is a diagram illustrating a configuration of the thermal fixing unit according to a second modification of the present disclosure.

FIG. 37 is a diagram illustrating a configuration of the thermal fixing unit 50 according to a second modification of the present disclosure.

As illustrated in FIG. 37, the first thermistor 56a is disposed at the center in the axial direction of the first thermal fixing roller 120a, and the third thermistor 56b is disposed at the end in the axial direction of the first thermal fixing roller 120a.

The first thermistor 56a and the second thermistor 56c are disposed separate positions displaced from each other in the axial direction on the first thermal fixing roller 120a In this case, it is preferable to store, in advance as data, the relation of difference in the temperatures at the center and the end in the axial direction of the first thermal fixing roller 120a. In such a case, the temperature at the center in the axial direction of the first thermal fixing roller 120a can be estimated with the third thermistor 56b that is disposed at the end in the axial direction of the first thermal fixing roller 120a.

The second thermistor 56c and the fourth thermistor 56d may be disposed on the second thermal fixing roller 120b instead of the first thermal fixing roller 120a.

Figure 38:
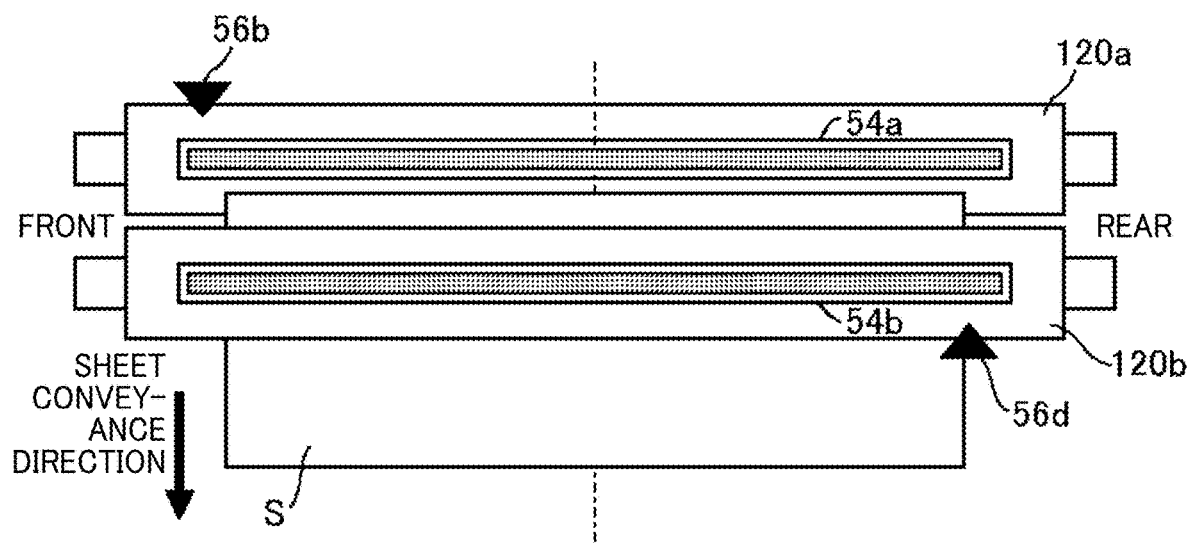
FIG. 38 is a diagram illustrating a configuration of a thermal fixing unit according to a third modification of the present disclosure.

FIG. 38 is a diagram illustrating a configuration of the thermal fixing unit 50 according to a third modification of the present disclosure.

As illustrated in FIG. 38, the third thermistor 56b is disposed at an end in the axial direction (front side) of the first thermal fixing roller 120a, and the fourth thermistor 56d is disposed at an end in the axial direction (rear side) of the second thermal fixing roller 120b.

The third thermistor 56b and the fourth thermistor 56d are disposed separate positions displaced from each other in the axial direction on the respective thermal fixing rollers facing each other included in the thermal fixing roller pair 120. In other words, the third thermistor 56b is disposed on the front side in FIG. 38 and the fourth thermistor 56d is disposed on the rear side in FIG. 38. The third thermistor 56b and the fourth thermistor 56d are disposed outside the sheet passage region SPw of the sheet SP (i.e., the range is outside the sheet conveyance area) as illustrated in FIG. 34. Due to such a configuration, the third thermistor 56b and the fourth thermistor 56d are less susceptible to accumulation of the adhesive.

Figure 39:
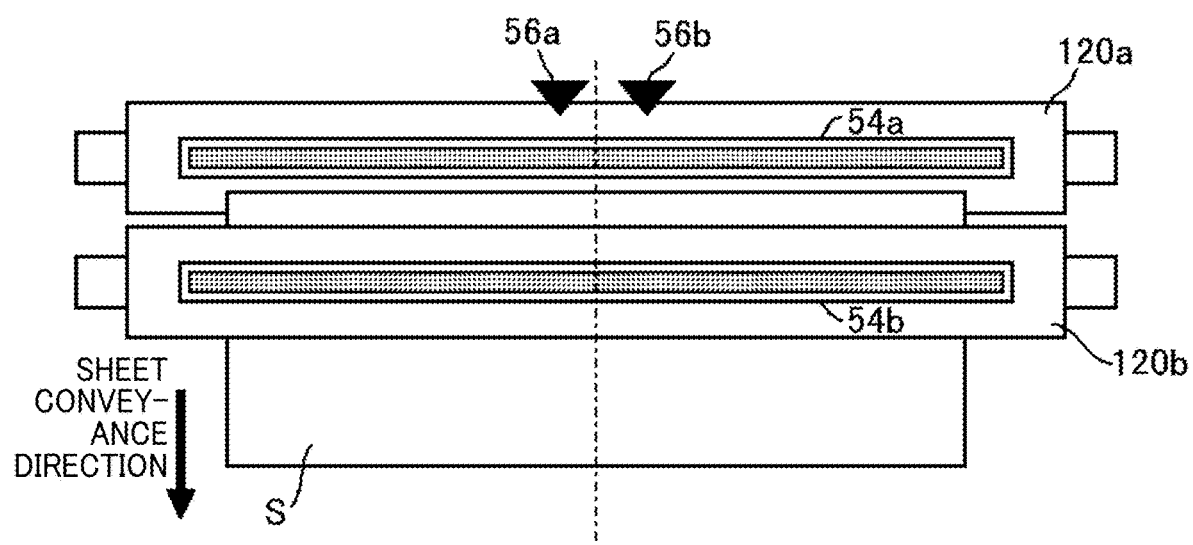
FIG. 39 is a diagram illustrating a configuration of a thermal fixing unit according to a fourth modification of the present disclosure.

FIG. 39 is a diagram illustrating a configuration of the thermal fixing unit 50 according to a fourth modification of the present disclosure.

As illustrated in FIG. 39, the first thermistor 56a and the second thermistor 56c are disposed at the center in the axial direction of the first thermal fixing roller 120a. The first thermistor 56a and the second thermistor 56c are displaced in the axial direction on the first thermal fixing roller 120a.

Instead of the first thermal fixing roller 120a, the second thermal fixing roller 120b may be provided with the first thermistor 56a and the second thermistor 56c.

Some embodiments of the present disclosure have been described in detail above. The above-described embodiments are examples and can be modified within the scope not departing from the gist of the present disclosure. For example, some embodiments and advantageous configurations may be combined with each other.

The effects obtained by the above-described embodiments are examples. The effects obtained by other embodiments are not limited to the above-described effects.

Now, a description is given of some aspects of the present disclosure.

Aspect 1

In Aspect 1, a sheet laminator includes a thermal fixing roller pair, a first heater, a second heater, multiple temperature detectors, and a driver. The thermal fixing roller pair includes a first thermal fixing roller and a second thermal fixing roller facing the first thermal fixing roller. The thermal fixing roller pair thermally fixes and conveys a two-ply sheet and a sheet medium nipped between two sheets of the two-ply sheet. The first heater heats the first thermal fixing roller. The second heater heats the second thermal fixing roller. The multiple temperature detectors are at different positions along an axial direction of the thermal fixing roller pair. The multiple temperature detectors detect a surface temperature of each of the thermal fixing roller pair. The driver drives the thermal fixing roller pair.

Aspect 2

In Aspect 2 of the present disclosure, according to Aspect 1, each of the thermal fixing roller pair includes a core metal portion at a center portion of each of the thermal fixing roller pair, an elastic layer around the core metal portion, and a fluororesin layer on a surface of the elastic layer.

Aspect 3

In Aspect 3 of the present disclosure, according to Aspect 1 or Aspect 2, the multiple temperature detectors include a first temperature detector at a center portion of the first thermal fixing roller in an axial direction, and a second temperature detector at a center portion of the second thermal fixing roller in an axial direction. The first temperature detector and the second temperature detector are at different positions from each other in the axial direction.

Aspect 4

In Aspect 4 of the present disclosure, according to any one of Aspects 1 to 3, the multiple temperature detectors further include a third temperature detector at an end portion of the first thermal fixing roller in an axial direction and outside a conveyance area of the two-ply sheet of the thermal fixing roller pair.

Aspect 5

In Aspect 5 of the present disclosure, according to Aspect 4, the multiple temperature detectors further include a fourth temperature detector at an end portion of the second thermal fixing roller in an axial direction and outside a conveyance area of the two-ply sheet of the thermal fixing roller pair. The third temperature detector and the fourth temperature detector are at different positions from each other across the conveyance area of the two-ply sheet of the thermal fixing roller pair.

Aspect 6

In Aspect 6 of the present disclosure, according to any one of Aspects 1 to 5, the sheet laminator further includes a first thermostat facing the first thermal fixing roller, and a second thermostat facing the second thermal fixing roller. The first thermostat is to detect a first ambient temperature of the first thermal fixing roller, and disconnect the first heater from the first thermal fixing roller in response to a detection of the first ambient temperature equal to or higher than a first given value. The second thermostat is to detect a second ambient temperature of the second thermal fixing roller, and disconnect the second heater from the second thermal fixing roller in response to a detection of the second ambient temperature equal to or higher than a second given value.

Aspect 7

In Aspect 7 of the present disclosure, an image forming system includes the sheet laminator according to any one of Aspects 1 to 6, and an image forming apparatus to form an image on a sheet medium to be supplied to the sheet laminator.

The present disclosure is not limited to specific embodiments described above, and numerous additional modifications and variations are possible in light of the teachings within the technical scope of the appended claims. It is therefore to be understood that, the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

The effects described in the embodiments of this disclosure are listed as the examples of preferable effects derived from this disclosure, and therefore are not intended to limit to the embodiments of this disclosure.

The embodiments described above are presented as an example to implement this disclosure. The embodiments described above are not intended to limit the scope of the invention. These novel embodiments can be implemented in various other forms, and various omissions, replacements, or changes can be made without departing from the gist of the invention. These embodiments and their variations are included in the scope and gist of this disclosure and are included in the scope of the invention recited in the claims and its equivalent.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A sheet laminator comprising:
    a thermal fixing roller pair including:
        a first thermal fixing roller; and
        a second thermal fixing roller facing the first thermal fixing roller, and
        the thermal fixing roller pair configured to thermally fix and convey a two-ply sheet and a sheet medium nipped between two sheets of the two-ply sheet;
    a first heater configured to heat the first thermal fixing roller;
    a second heater configured to heat the second thermal fixing roller;
    multiple temperature detectors at different positions along an axial direction of the thermal fixing roller pair, the multiple temperature detectors configured to detect a surface temperature of each of the thermal fixing roller pair; and
    a driver configured to drive the thermal fixing roller pair.

2. The sheet laminator according to claim 1, wherein each of the thermal fixing roller pair includes:
    a core metal portion at a center portion of each of the thermal fixing roller pair;
    an elastic layer around the core metal portion; and
    a fluororesin layer on a surface of the elastic layer.

3. The sheet laminator according to claim 1, wherein:
    the multiple temperature detectors include:
    a first temperature detector at a center portion of the first thermal fixing roller in the axial direction; and
    a second temperature detector at a center portion of the second thermal fixing roller in the axial direction, and
    the first temperature detector and the second temperature detector are at different positions from each other in the axial direction.

4. The sheet laminator according to claim 3, wherein the multiple temperature detectors further include a third temperature detector at:
    an end portion of the first thermal fixing roller in the axial direction; and
    outside a conveyance area of the two-ply sheet of the thermal fixing roller pair.

5. The sheet laminator according to claim 4, wherein:
    the multiple temperature detectors further include a fourth temperature detector at:
    an end portion of the second thermal fixing roller in the axial direction; and
    outside a conveyance area of the two-ply sheet of the thermal fixing roller pair, and
    the third temperature detector and the fourth temperature detector are at different positions from each other in the axial direction across the conveyance area of the two-ply sheet of the thermal fixing roller pair.

6. The sheet laminator according to claim 1, further comprising:
    a first thermostat facing the first thermal fixing roller; and
    a second thermostat facing the second thermal fixing roller,
    wherein the first thermostat is configured to:
        detect a first ambient temperature of the first thermal fixing roller; and
        disconnect the first heater from the first thermal fixing roller in response to a detection of the first ambient temperature equal to or higher than a first given value, and
    the second thermostat is configured to:
        detect a second ambient temperature of the second thermal fixing roller; and
        disconnect the second heater from the second thermal fixing roller in response to a detection of the second ambient temperature equal to or higher than a second given value.

7. An image forming system comprising:
    the sheet laminator according to claim 1; and
    an image forming apparatus configured to form an image on a sheet medium to be supplied to the sheet laminator.

* * * * *